United States Patent [19]

Sasaki et al.

[11] 4,250,370
[45] Feb. 10, 1981

[54] DIGITAL CONTROL FOR A COOKING TIME AND POWER OF AN ELECTRIC COOKING DEVICE

[75] Inventors: Masayuki Sasaki; Shuichi Gotou, both of Kawasaki, Japan

[73] Assignee: Tokyo Shibaura Electric Co., Ltd., Japan

[21] Appl. No.: 936,040

[22] Filed: Aug. 23, 1978

Related U.S. Application Data

[63] Continuation of Ser. No. 736,356, Oct. 27, 1976, abandoned.

[30] Foreign Application Priority Data

Oct. 31, 1975 [JP] Japan ................................ 50-132044

[51] Int. Cl.³ .............................................. H05B 6/68
[52] U.S. Cl. .............................. 219/10.55 B; 219/506; 235/92 EC; 340/309.4; 340/711
[58] Field of Search ................... 219/10.55 B, 506; 235/92 T, 92 EC; 340/365 S, 365 E, 369.4, 715, 709, 711, 712, 641, 146.1 AB; 58/145 R, 24 R, 24 A

[56] References Cited

U.S. PATENT DOCUMENTS

| | | | |
|---|---|---|---|
| 3,699,531 | 10/1972 | Heimann | 340/712 |
| 3,753,032 | 8/1973 | Naidich et al. | 340/715 X |
| 3,798,428 | 3/1974 | Izawa | 235/92 T |
| 3,864,677 | 2/1975 | Bekki et al. | 340/715 X |
| 3,891,973 | 6/1975 | Maxwell | 235/92 T |
| 3,967,266 | 6/1976 | Roy | 340/709 |
| 3,974,472 | 8/1976 | Gould, Jr. | 219/506 |
| 3,986,333 | 10/1976 | Kimura et al. | 235/92 T |
| 4,011,428 | 3/1977 | Fosnough et al. | 219/10.55 B |
| 4,086,588 | 4/1978 | Kawanabe et al. | 340/711 X |

OTHER PUBLICATIONS

TMS 1117 Microwave Oven Controller Feature Summary, Texas Instruments Inc., Copyright, 1976.
Literature of Cook-N-Care Guide From Frigidaire.

*Primary Examiner*—C. L. Albritton
*Assistant Examiner*—Philip H. Leung
*Attorney, Agent, or Firm*—Finnegan, Henderson, Farabow, Garrett & Dunner

[57] ABSTRACT

A control device adapted to control cooking time and power of an electric cooking device. By depressing entry keys on a control panel a desired cooking time data and power level setting data are entered in first and second shift registers respectively. Next when a cooking start key is depressed the electric cooking device starts its operation at a power corresponding to the power level setting data and the down count operation of the time data in the first shift register is started. When the time data in the first shift register becomes zero due to the down count operation the cooking device stops its operation. The data in the first and second shift registers are displayed by digital indicators. The time data in the first shift register is detected whether or not it has an erroneous digit or digits and any detected erroneous digit or digits are blanked or flashed on the digital indicators.

21 Claims, 22 Drawing Figures

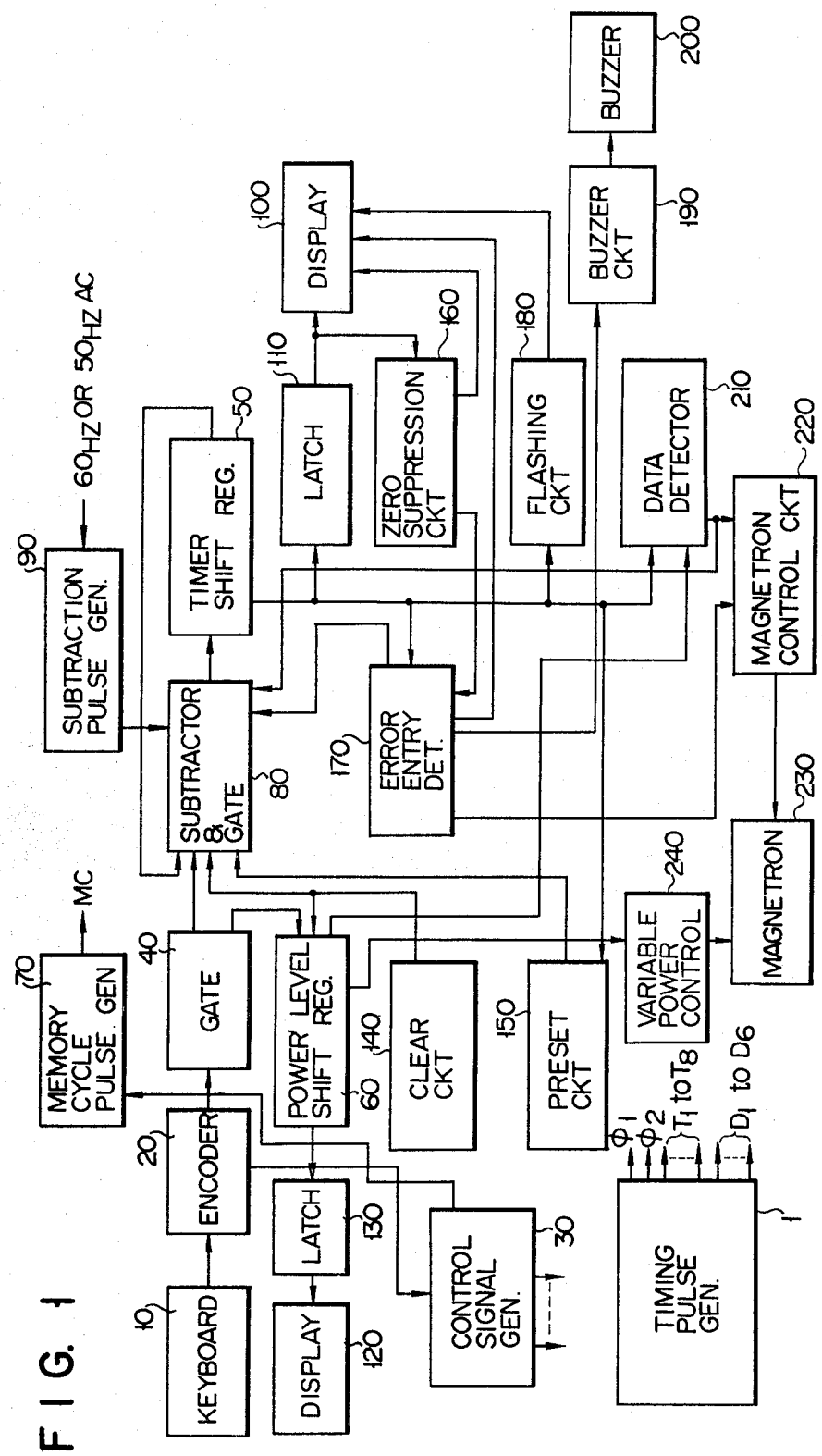
F I G. 1

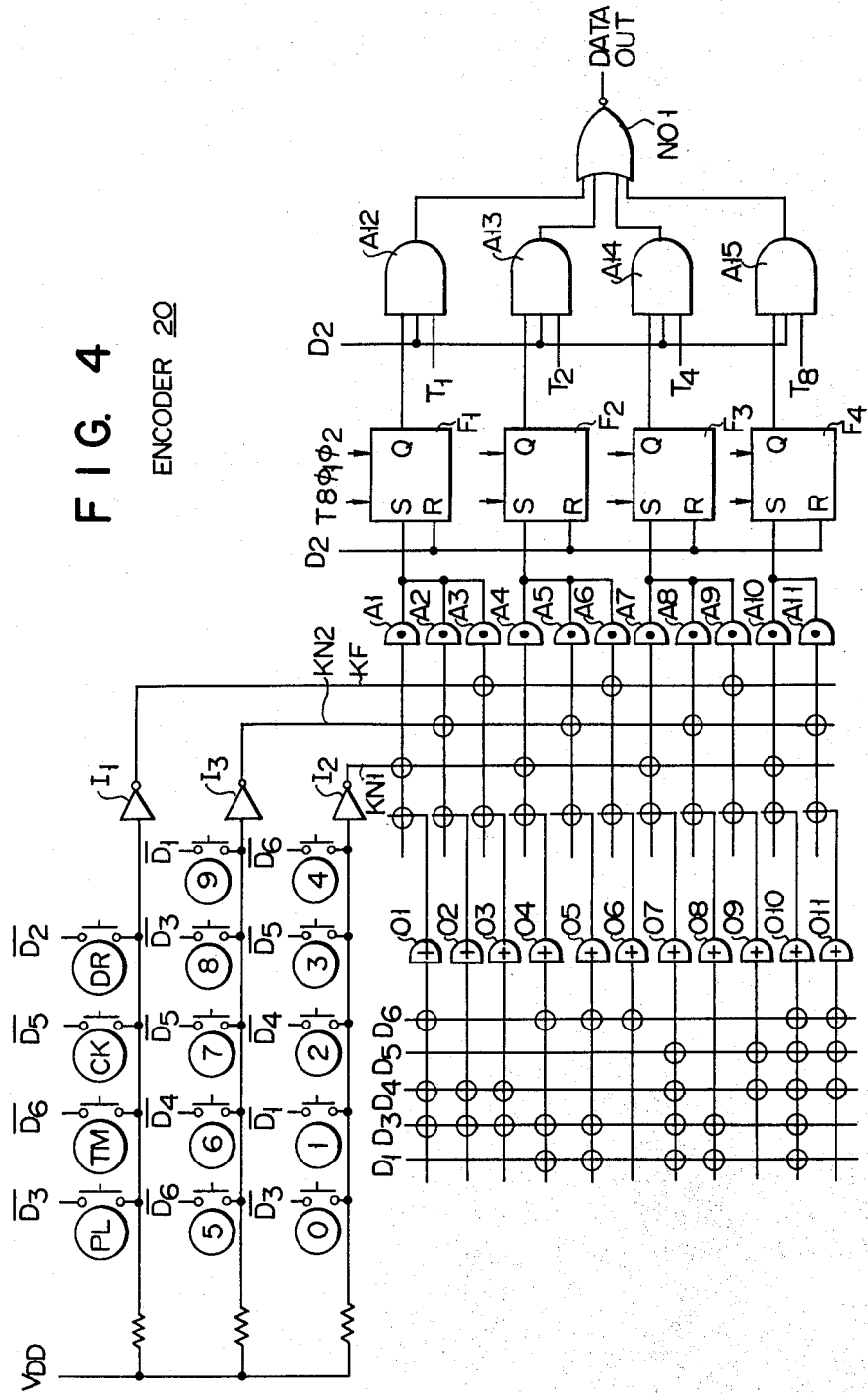
FIG. 4 ENCODER 20

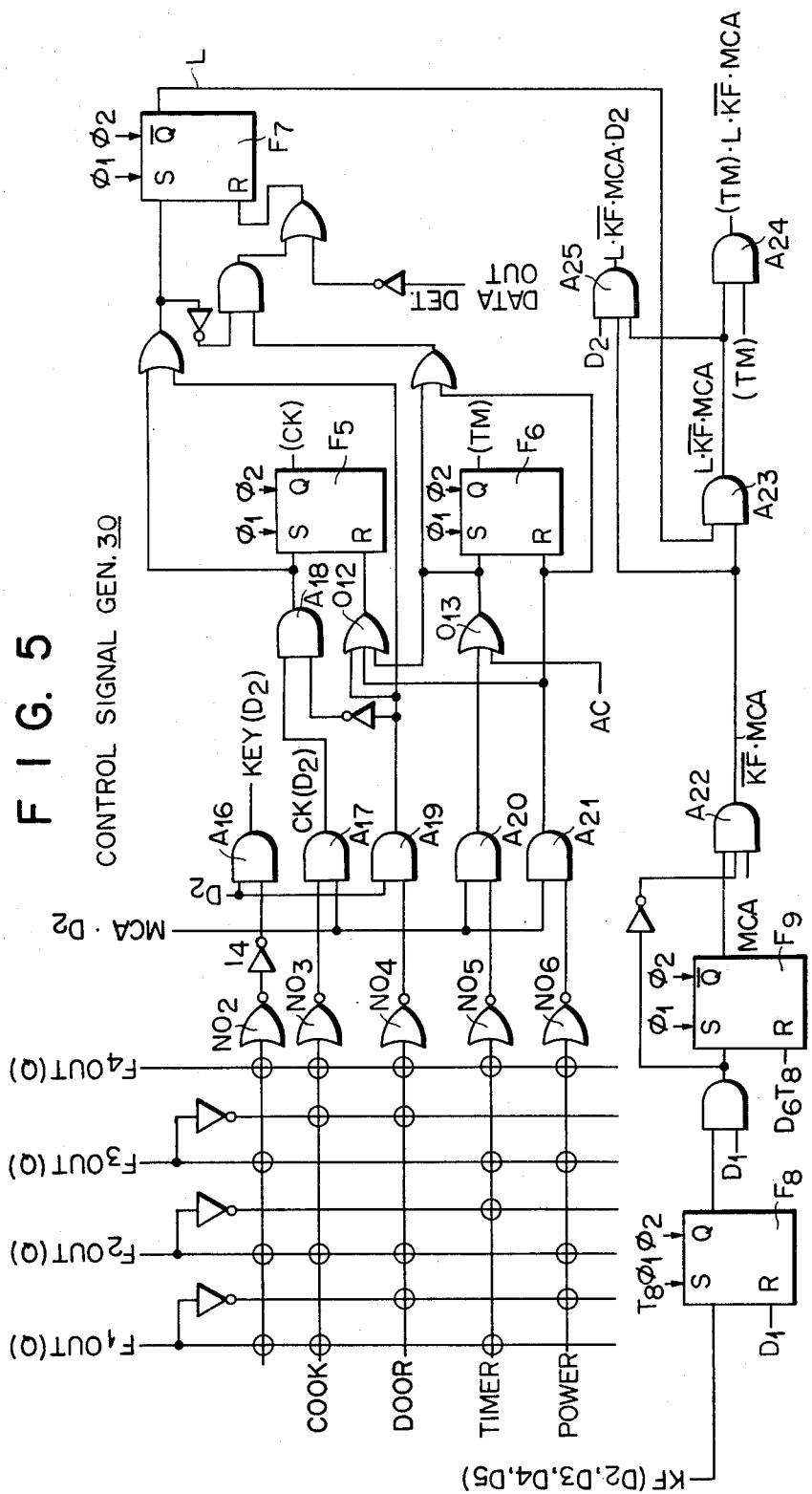

FIG. 8

| D₃ | | | | D₂ | | | | D₁ | | | |
|---|---|---|---|---|---|---|---|---|---|---|---|
| T₈ | T₄ | T₂ | T₁ | T₈ | T₄ | T₂ | T₁ | T₈ | T₄ | T₂ | T₁ |
| 0 | 0 | 0 | 1 (1) | 1 | 0 | 0 | 1 (9) | 1 | 0 | 0 | 1 (9) |

—BORROW

| | | | | | | | | 0 | 1 | 1 | 1 (7) |
| | | | | | | | | | | | 1 |
| | | | | | | | | 0 | 1 | 0 | 1 (5) |
| | | | | | | | | | | | 1 |
| | | | | | | | | 0 | 0 | 1 | 1 (3) |
| | | | | | | | | | | | 1 |
| | | | | 1 | 0 | 0 | 1 (9) | 0 | 0 | 0 | 1 (1) |
| | | | | | | | | | | | 1 |
| | | | | 1 | 0 | 0 | 0 (8) | 1 | 1 | 1 | 1 (15) |

PRESET

| | | | | | | | | 1 | 0 | 0 | 1 (9) |
| | | | | | | | | | | | 1 |
| | | | | | | | | 0 | 1 | 1 | 1 (7) |
| | | | | | | | | | | | 1 |
| | | | | 1 | 0 | 0 | 0 | 0 | 0 | 0 | 1 (1) |
| | | | | | | | | | | | 1 |
| | | | | 0 | 1 | 1 | 1 (7) | 1 | 1 | 1 | 1 |
| | | | | | | | | 1 | 0 | 0 | 1 |

| | | | | 0 | 1 | 1 | 0 (6) | 1 | 1 | 1 | 1 |
| | | | | | | | | 1 | 0 | 0 | 1 |

⋮

| | | | | 0 | 0 | 0 | 1 (1) | 0 | 0 | 0 | 1 |
| | | | | | | | | | | | 1 |
| | | | | 0 | 0 | 0 | 0 | 1 | 1 | 1 | 1 |
| | | | | | | | | 1 | 0 | 0 | 1 |

| 0 | 0 | 0 | 1 | 0 | 0 | 0 | 0 | 0 | 0 | 0 | 1 |
| | | | | | | | | | | | 1 |
| 0 | 0 | 0 | 0 (0) | 1 | 1 | 1 | 1 | 1 | 1 | 1 | 1 |
| | | | | 1 | 0 | 0 | 1 | 1 | 0 | 0 | 1 |

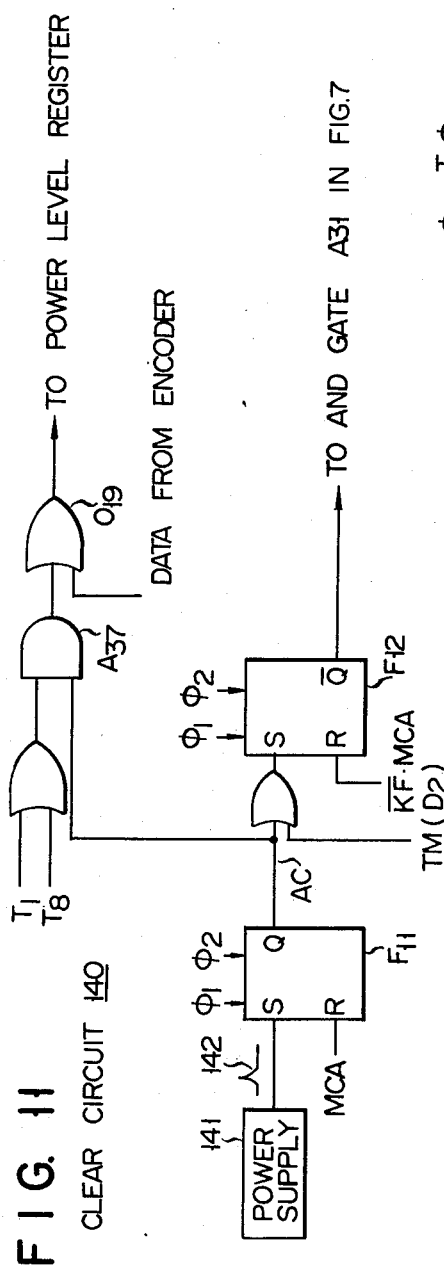
FIG. 11 CLEAR CIRCUIT 140
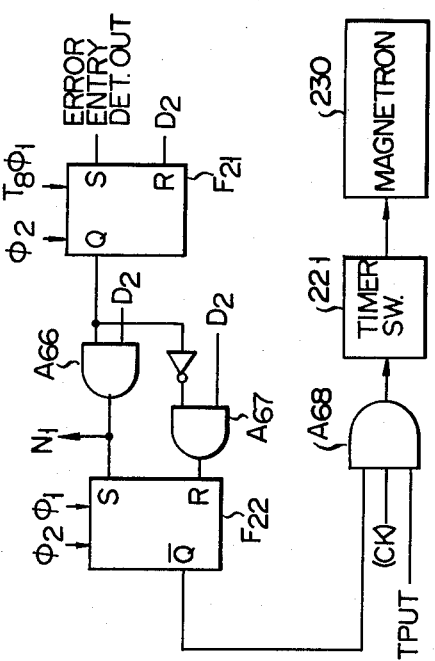
FIG. 17 MAGNETRON CONTROL CIRCUIT 220

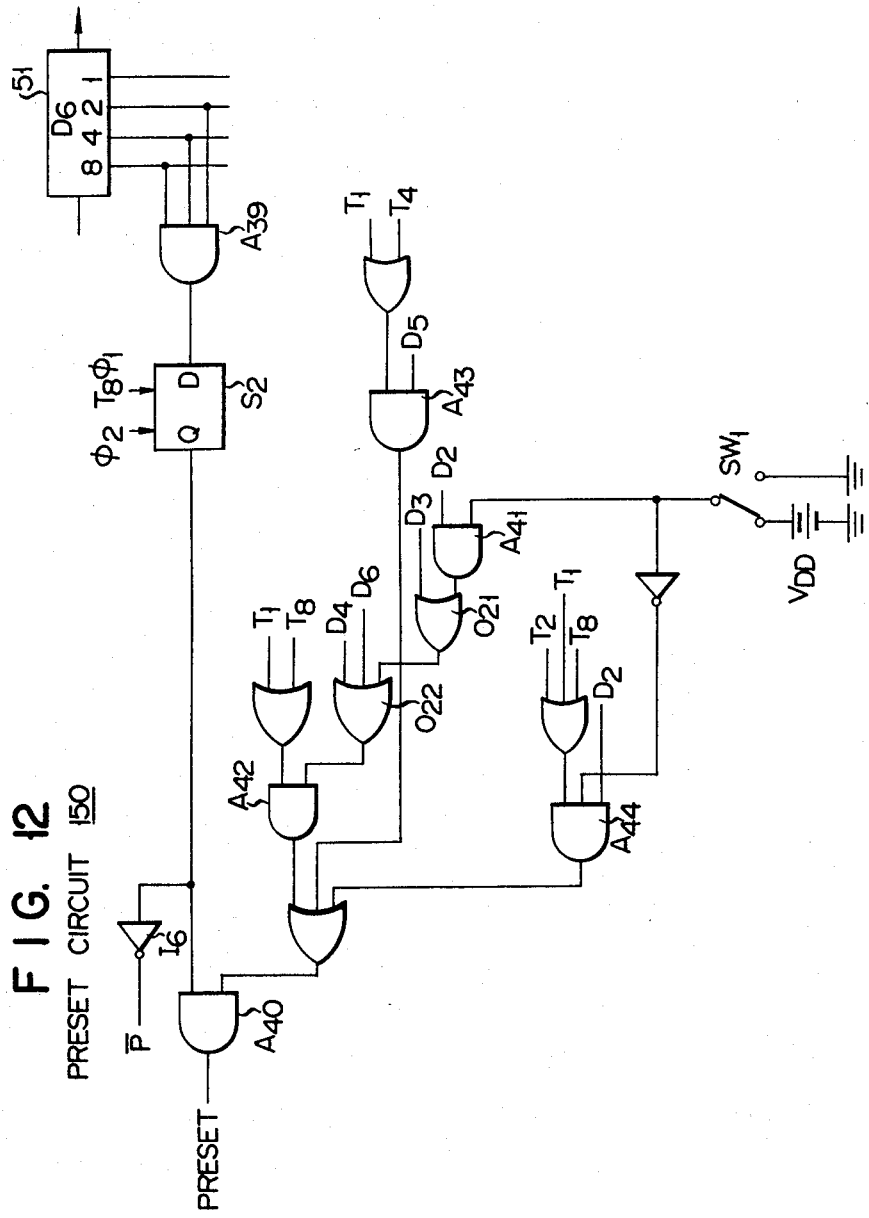
FIG. 12 PRESET CIRCUIT 150

ZERO SUPPRESSION CIRCUIT 160

ERROR ENTRY DET. 170

DATA DETECTOR 210

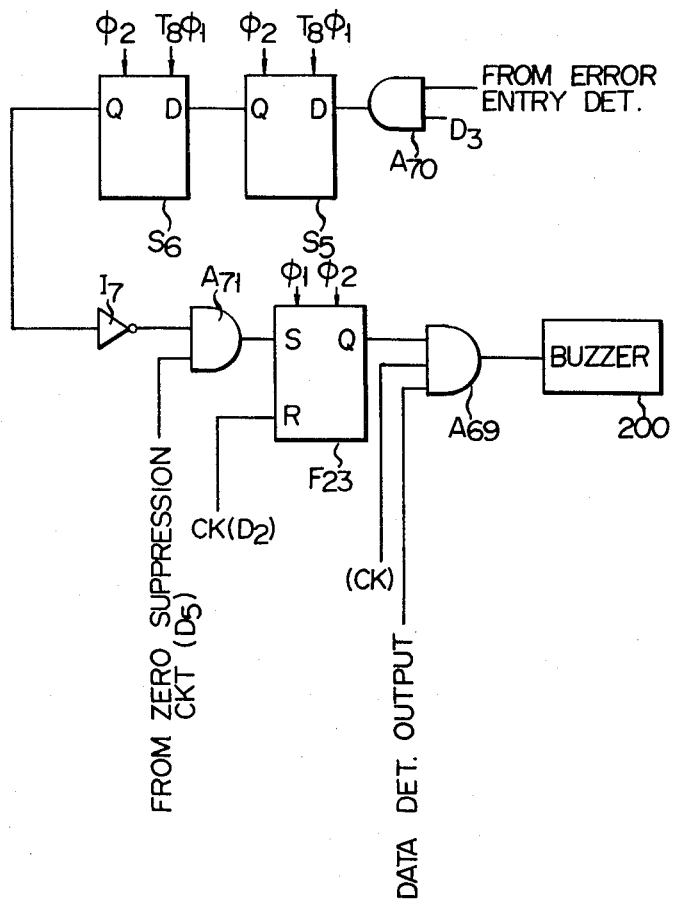
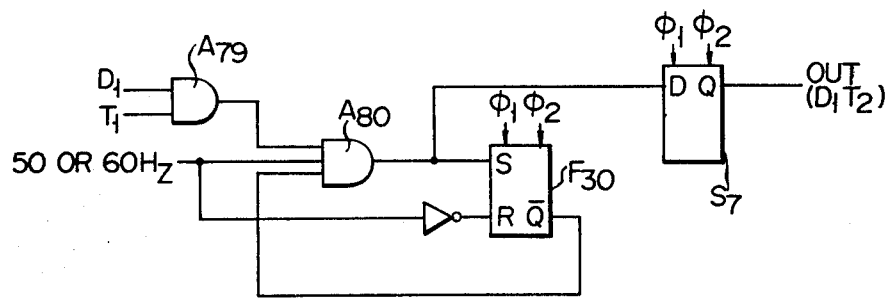

DIGITAL CONTROL FOR A COOKING TIME AND POWER OF AN ELECTRIC COOKING DEVICE

This is a continuation application of Ser. No. 736,356 filed Oct. 27, 1976, now abandoned.

This invention relates to a digital control device for controlling the cooking time and power of an electric cooking device such as an electronic range, oven etc.

For example, a conventional electronic range uses a mechanical timer and in many cases a magnetron of an electronic range is not power controlled. Even when the magnetron is controlled in power level, adjustment is only effected in two steps of "strong" and "weak". In this case, however, the power control is effected independently of the setting of the cooking time and, from the standpoint of manufacture and use, inconveniences are encountered in the handling and adjustment of the cooking device.

It is accordingly the object of this invention to provide a control device for an electric cooking device which is free from the above-mentioned drawbacks and capable of digitally setting, controlling and displaying a power level and cooking time of the cooking device.

According to one aspect of this invention there is provided a digital control device for controlling the cooking time and power of an electric cooking device comprising first shift register means for storing a time data on a cooking time of the cooking device; second shift register means for storing a data on a power level of the cooking device; means for setting the cooking time data and the power level data to the first and second shift register means, respectively; digital display means coupled to the first and second shift register means to display the data stored in the first and second shift register means, subtraction pulse generating means for generating a subtraction pulse for each predetermined time; subtraction means coupled to the first shift register means and the subtraction pulse generating means for subtracting for each predetermined time a predetermined number from the time data stored in the first shift register means in response to the subtraction pulses; cooking device control means coupled to the first shift register means for operating the cooking device after the storage of data in the first and second shift register means and stopping the operation of the cooking device when the time data in the first shift register means becomes a predetermined number through subtraction; and variable power control means coupled to the second shift register means for setting the cooking device to a power corresponding to the data stored in the second shift register means.

According to another aspect of this invention there is provided a digital control device for controlling cooking time and power of an electric cooking device comprising a keyboard means having numeral keys, timer key, power level key and cook key; entry means coupled to said keyboard means to generate in response to the depression of one of the numeral keys an output as a numerical data corresponding to the numerical value of the depressed key; first shift register means having a plurality of digit stages and adapted to store in response to the depression of the timer key and numeral keys a time data on a cooking time of the cooking device which corresponds to the numerical values of the depressed numeral keys; second shift register means coupled to the output of the entry means to store in response to the depression of the power level key and numeral keys a data on a power level of the cooking device which corresponds to the depressed numeral key; digital display means coupled to the first and second shift register means to display the data stored in the first and second shift register means; subtraction pulse generating means for generating a subtraction pulse for each predetermined time; subtraction means coupled to the first shift register means and the subtraction pulse generating means and adapted to subtract in response to the depression of the cook key and to the subtraction pulse and for each predetermined time a predetermined number from the time data stored in the first shift register means; cooking device control means coupled to the first shift register means and adapted to operate the cooking device in response to the depression of the cook key after the storage in the first and second shift register of data on the cooking time and power level and stop the operation of the cooking device when the data in the first shift register becomes a predetermined number through subtraction; and variable power control means coupled to the second shift register means and adapted to set the cooking device to a power corresponding to the data stored in the second shift register means.

This invention can be more fully understood from the following detailed description when taken in conjunction with the accompanying drawings, in which:

FIG. 1 is a block diagram of an electric cooking device according to one embodiment of this invention;

FIG. 4 shows an encoder in FIG. 1;

FIG. 5 shows a control signal generator in FIG. 1;

FIG. 8 is a diagram useful in explaining the operation of the subtractor of FIG. 7;

FIG. 11 shows a clear circuit in FIG. 1;

FIG. 12 is a preset circuit in FIG. 1;

FIG. 17 is a magnetron control circuit in FIG. 1;

FIG. 18 is a buzzer operating circuit in FIG. 1;

FIG. 21 is a subtraction pulse generating circuit in FIG. 1; and

Figure 2:
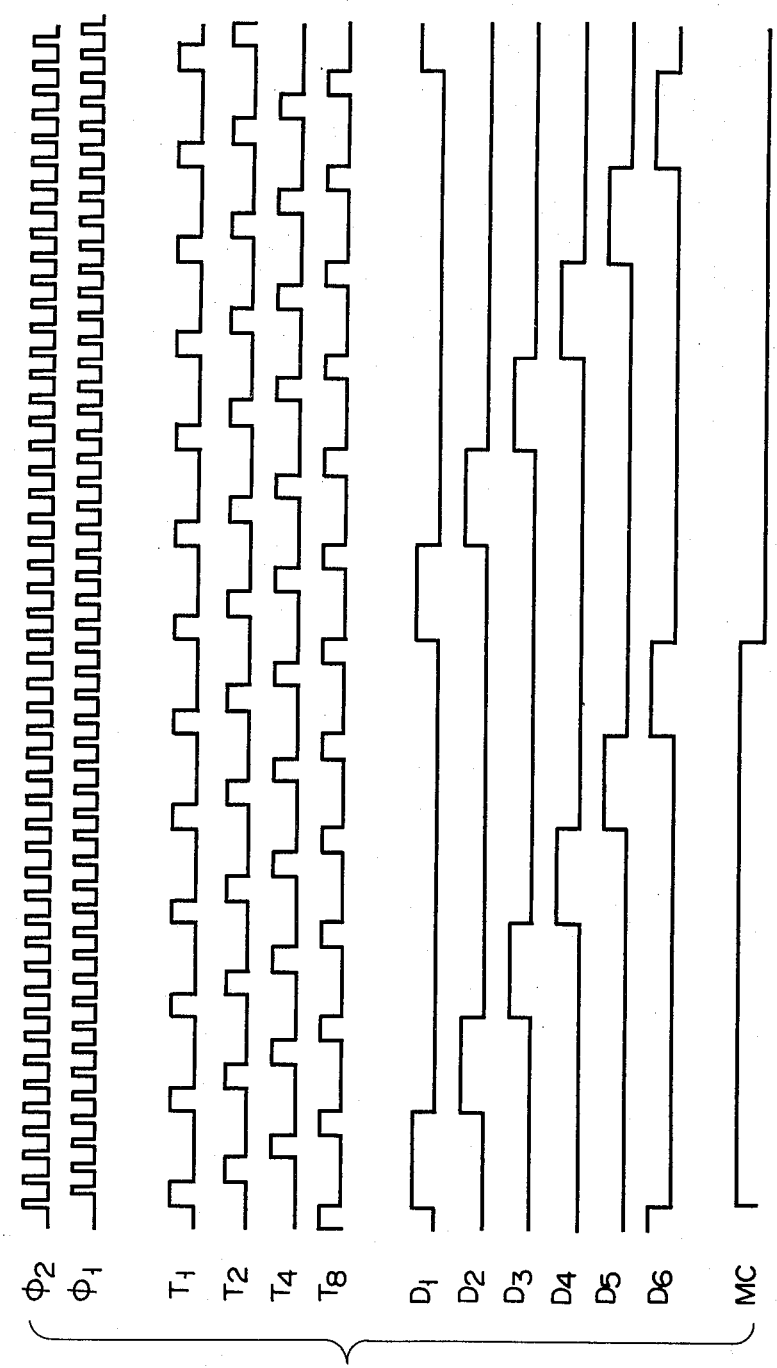
FIG. 2 is a time chart of various timing signals used in this invention.

An electronic range including a magnetron will now be explained below by way of example of this invention.

FIG. 1 shows a block diagram of one embodiment of this invention. Reference numeral 1 is a timing pulse generator for generating timing signals including clock pulses $\phi_1$ and $\phi_2$, bit pulses $T_1$, $T_2$, $T_4$ and $T_8$ and digit pulses $D_1$ to $D_6$ and adapted to be applied to each block. Reference numeral 10 is a keyboard including function keys having a cook start key (hereinafter referred to as a cook key) CK, a cooking time setting key (hereinafter referred to as a timer key) TM and a power level setting key (hereinafter referred to a power level key) PL and 10 entry keys to which decimal numbers 0 to 9 are allotted. An encoder 20 is connected to the keyboard section 10 and generates upon depression of any entry key a binary-coded-decimal data which corresponds to the decimal number allotted to the entry key. Upon depression of any function key the encoder 20 generates a binary-coded-decimal data other than these binary-coded-decimal data allotted to the entry keys, thereby discriminating which function is depressed.

A control signal generator 30 is connected to the encoder 20 and generates a key depression representing signal for indicating the depression of a function key or an entry key, a signal for indicating the depression of the function key, and various control signals when the function keys are depressed.

A numerical data generated from the encoder 20 when an entry key is depressed on the keyboard 10 is entered through a gate circuit 40 into a timer shift register 50 or a power level shift register 60 at the timing of digit pulse $D_2$. The gate circuit 40 permits the data to be entered in the timer shift register 50 after the timer key TM is depressed and to be entered in the power level shift register 60 after the power level key PL is depressed. A numerical data obtained when a function key is depressed is not entered in either of these registers 50 and 60, since the gate circuit 40 is disabled by a control signal which is formed by the control signal generator 30 when the function key is depressed. The gate circuit 40 is adapted to permit a data to be entered into the timer shift register 50 even when the timer key TM is not depressed upon closure of a power switch.

After a key is depressed on the keyboard a memory cycle pulse generator 70 generates in response to a key depression representing signal from the control signal generator 30 one memory cycle pulse MCA having a width which ranges over the digit pulses $D_1$ to $D_6$. Since the gate circuit 40 is enabled during the memory cycle pulse MCA period, even if a numerical key is continuously depressed, the data is not sequentially entered into the register. The memory cycle pulse generator 70 forms a memory cycle pulse MCB even after the key is released. FIG. 2 is a time chart of the memory cycle pulse MC, clock pulse $\phi_1$ and $\phi_2$, bit pulses $T_1$, $T_2$, $T_4$ and $T_8$ and digit pulses $D_1$ to $D_6$.

In this embodiment, a cooking time is set in terms of minutes (two digits) and second (two digits) and the power level is set at one of 9 levels from 1 to 9. In consequence the power level shift register 60 is constructed of one digit stage having four bit stages. The timer shift register 50 is constructed of seven digit stages, i.e., four digit stages for cooking time setting, two digit stages for a down count operation and one digit stage for a digit shift at the entry of time data. Each digit stage of the time shift register is constructed of four bit stages. Suppose that the four stages for cooking time setting are represented by first, second, third and fourth stages, two stages for the down count operation are represented by fifth and sixth stages, and the digit pulses $D_6$, $D_5$, $D_3$, $D_2$ and $D_1$ corresponds to the first, second, third, fourth, fifth and sixth stages. Since a one-digit time data is entered at a timing of the digit pulse $D_2$ into the timer shift register 50, a tens minute data is entered in the first stage $D_6$; a units minute data in the second stage $D_5$; a tens second data in the third stage $D_4$; and a units second data in the fourth stage $D_3$. The fifth digit stage $D_2$ is used for a tenths second data, and the sixth digit stage $D_1$ for a fiftieths second or sixtieth second data. When a cooking time is entered 15(1111) is preset in the fifth and sixth digit stages. After completion of the time data entry the first to sixth digit stages forms a circulating shift register.

A subtractor and gate circuit 80 is connected between the timer shift register 50 and the gate circuit 40. The timer shift register 50 permits data to be circulated through the subtractor and gate circuit 80. The subtractor is a half-subtractor and adapted to subtract from a cooking time data set in the timer shift register 50 a unit time, for example, one second in response to the depression of the cook key CK and to subtraction pulses from a subtraction pulse generator 90. The subtraction pulse generator 90 generates through a 60 or 50 Hz AC supply one subtraction pulse per cycle of the AC voltage. In this embodiment one pulse per one cycle of AC power supply is generated at timing of $D_1 \cdot T_2$. In the fifth and sixth digit stages of the timer shift register 50 are preset such predetermined decimal numbers that each of them becomes 15 (all the bits become 1) after down count by the numbers of subtraction pulses ($D_1 \cdot T_2$) per second. When all of the bits of the fifth and sixth stages become "1", one borrow signal per second is generated and one second is subtracted from the cooking time by this borrow signal.

The down count, i.e., the subtraction of the timer shift register 50 is stopped when the content of the timer shift register 50 becomes "0", when the timer key or the power level key is depressed, or when the door of the cooking apparatus is opened. Upon depression of the timer key the timer shift register is cleared. When the power level key is depressed or when the door of the electronic range is opened, the timer shift register stops its down count, but the content of the timer shift register is maintained. In this case, the down count of the timer shift register is restarted by depression of the cook key.

Figure 3:
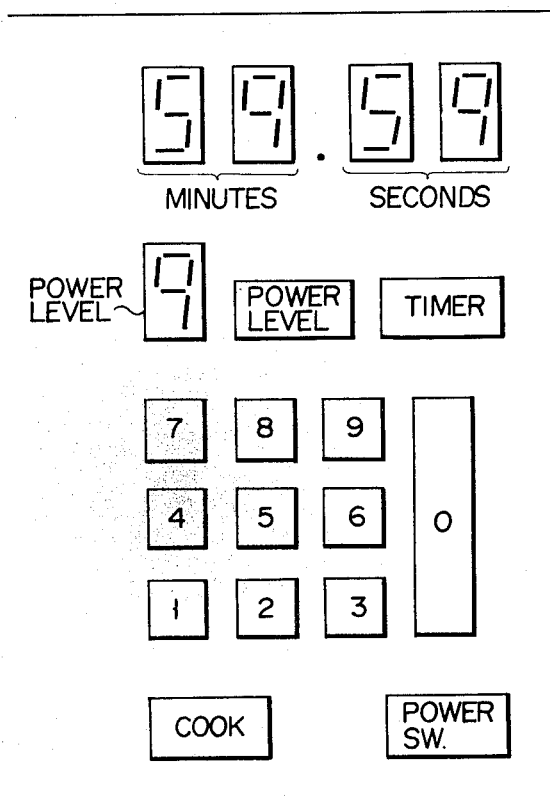
FIG. 3 is a front view of a control panel of the cooking device.

A four-digit digital display 100 for displaying a remaining cooking time data in the register 50 is connected through a latch circuit 110 to the timer shift register 50. A one-digit digital display for displaying a power level setting data in the shift register 60 is connected through a latch circuit 130 to the power level shift register 60. FIG. 3 shows a control panel of the cooking apparatus including the keyboard 10 and displays 100 and 120. Among switches on the control panel, only a power switch is of a holding type.

In FIG. 1, reference numeral 140 is a clear circuit 140. The clear circuit 140 clears the timer shift register 60 when the power switch is closed and presets a predetermined number, for example, the maximum power setting data 9 to the power level shift register 60. The clear circuit is also operated by the timer key to clear the timer shift register 50.

Reference numeral 150 is a preset circuit connected to the timer shift register 50 and adapted to preset a predetermined number into each digit stage after all the bits of each digit stage of the timer shift register become 1. The number 5 is preset in the first digit stage for a tens minute data; 9, in the second digit stage for a units minute data; 5, in the third digit stage for a tens second data 9, in the fourth digit stage for a units second data; 9, in the fifth digit stage for a tenths second data; and (in case the power supply frequency is 50 Hz) 9, in the sixth digit stage for a fiftieths second data. In a case where the power supply frequency is 60 Hz, 11 is preset in the sixth digit stage.

Reference numeral 160 is a zero suppression circuit connected to the output of the latch circuit 110. The zero suppression circuit 160 is adapted to detect non-significant zero or zeroes in a time data stored in the timer shift register 50 and blank such zero or zeroes on the display 100. When, for example, a data representing "5 minutes and 30 seconds" is stored in the timer shift register, the first digit stage stores "0"; the second digit stage, "5", the third stage, "3"; and the fourth stage, "0". Since the "0" in the first stage is a non-significant zero, only the contents in the second, third and fourth digit stages are displayed on the display. Before a cooking time is entered in the timer shift register the contents of the first to fourth digit stages are all "zero". In this case, the "0" in the fourth digit stage only is displayed and zeroes in the first to third digit stages are blanked on the display.

In this embodiment a maximum time registrable in the timer shift register is predetermined and, for example, the maximum time can be selected to be either "59 minutes and 59 seconds" or "15 minutes and 59 seconds". If in this case a time exceeding such a maximum time is erroneously set, it is necessary to detect it for notice to the user. Reference numeral 170 is an error entry detection circuit adapted to select a maximum time settable in the timer shift register and to detect that a time exceeding such a maximum time had been set in the timer shift register. When, for example, the maximum time "59 minutes and 59 seconds" is selected, the error entry detection circuit 170 detects the contents of the first and third digit stages and, if the content of at least one of the first and third digit stages is 6 or more, it generates a detection output. When, for example, the maximum time is "15 minutes and 59 seconds", the error entry detection circuit 170 detects the contents of the first, second and third digit stages and, if the content of the first stage is two or more and/or if the content of at least one of the second and third digit stages is 6 or more, it generates a detection output. It is noted, however, that, if the case of the maximum time "15 minutes and 59 seconds" the content of the first digit stage is zero, the error entry detection circuit does not detect the content of the second digit stage in accordance with the output of the zero suppression circuit 160. The output of the error entry detection circuit 170 is applied to the display device 100, thereby blanking the content of the digit stage or stages which are erroneously entered. This offers the user an indication as to in which digit stage an erroneous entry is made. When such an erroneous entry is present, no down count of the timer shift register is effected and the magnetron is not operated even upon depression of the cook key. The presence of the error entry detection circuit prevents an entry of a time which exceeds the preset maximum time.

Reference numeral 180 is a flashing circuit adapted to, when a time exceeding the preset maximum time is erroneously entered, flash the display corresponding to a stage or stages associated with the erroneous entry, thereby informing the user of an erroneously entered number or numbers.

Reference numeral 190 is a buzzer circuit adapted to sound a buzzer 200 when a remaining cooking time in the timer shift register 50 becomes, for example, 5 seconds, noticing the user that the cooking time will be finished in five seconds. The sounding of the buzzer is stopped when the content of the timer shift register 50 becomes zero.

Reference numeral 210 is a data detector adapted to detect that the content of the timer shift register 50 and/or the power level shift register 60 is zero.

Reference numeral 220 is a magnetron control circuit including a timer switch of the magnetron 230. The timer switch is turned ON in response to the depression of the cook key when a cooking time is correctly set in the timer shift register 50 and the contents of the timer shift register 50 and power shift register 60 are both not zero. The down count of the timer shift register 50 is started by the depression of the cook key and, when as a result of the down count the content of the timer shift register becomes zero, the timer switch is turned OFF by the action of the data detector 210.

The output of the power level shift register 60 is applied to a variable power control circuit 240 to cause the magnetron 230 to be operated at a power corresponding to a numeral value stored in the power level shift register. The variable power control circuit 240 includes an astable multivibrator adapted to subject a magnetron oscillation to an ON-OFF control and selectable resistors in the time constant circuit in the multivibrator for setting an ON-OFF rate (mark-space rate) of an output of the multivibrator. When one of these resistors is selected by the output of the power shift register, the multivibrator oscillates with an ON-OFF rate determined by the value of the resistor so selected. The magnetron repeats its ON-OFF operation by the oscillation of the multivibrator. Since a ratio between the ON time and the OFF time of the magnetron is dependent upon a power level setting data in the power level shift register 60, the output power of the magnetron can be controlled. A means for controlling the power of the magnetron through control of the ON-OFF rate of an output of the multivibrator is known in the art.

Each block in FIG. 1 will now be described in more detail.

FIG. 4 shows the encoder 20. One terminals of each of a power level key switch PL, timer key switch TM, cook key switch CK and door switch DR is connected to an inverter $I_1$ and through a resistor to a $V_{DD}$ terminal. To the other terminals of these function key switches are applied corresponding negative digit pulses as shown. One terminal of each of key switches of entry keys 0 to 4 is connected to an inverter $I_2$ and through a resistor to the $V_{DD}$ terminal. One terminal of each of key switches of entry keys 5 to 9 is connected to an inverter $I_3$ and through a resistor to the $V_{DD}$ terminal. To the other terminals of these entry keys 0 to 9 are applied corresponding negative digit pulses as shown. When no key is depressed, the output of each inverter is at a low level "0". The output of the inverters $I_1$, $I_2$ and $I_3$ is connected respectively through lines $KF_1$, $KN_1$ and $KN_2$ to a logic circuit. The logic circuit includes OR gates $O_1$ to $O_{11}$ to which the corresponding digit pulses are applied and AND gates $A_1$ to $A_{11}$ to which one of the outputs of the OR gates and one of the outputs of the inverters are supplied. The outputs of the AND gates $A_1$ to $A_3$ are connected to the set input of a flip-flop circuit $F_1$; the outputs of the AND gates $A_4$ to $A_6$, to the set input of a flip-flop circuit $F_2$; the outputs of the AND gates $A_7$ to $A_9$, to the set input of a flip-flop circuit $F_3$; and the outputs of the AND gates $A_{10}$ to $A_{11}$; to the set input of a flip-flop circuit $F_4$. The digit pulse $D_2$ is applied to the reset terminals of the flip-flop circuits $F_1$ to $F_4$. The flip-flop circuits $F_1$ to $F_4$ are also adapted to receive a pulse $T_8\phi_1$ as a read-in pulse and a pulse $\phi_2$ as a readout pulse.

An AND gate $A_{12}$ is connected to receive an output Q of the flip-flop circuit $F_1$ as well as the digit pulse $D_2$ and bit pulse $T_1$; an AND gate $A_{13}$, to receive an output Q of the flip-flop circuit $F_2$ as well as the digit pulse $D_2$ and bit pulse $T_2$; and AND gate $A_{14}$, to receive an output Q of the flip-flop circuit $F_3$ as well as the digit pulse $D_2$ and bit pulse $T_4$; and an AND gate $A_{15}$, to receive an output Q of the flip-flop circuit $F_4$ as well as the digit pulse $D_2$ and bit pulse $T_8$. The outputs of the AND gates $A_{12}$ to $A_{15}$ are connected to a NOR gate NO1.

When neither the entry key nor the function key is depressed, the outputs of the inverters $I_1$, $I_2$ and $I_3$ are all zero and thus the outputs of the AND gates $A_1$ to $A_{11}$ are all zero. In consequence, the outputs Q of the flip-flop circuits $F_1$ to $F_4$ are all zero and the NOR gate NO1 generates an output 15 (1111). At this time the output of the NOR gate NO1 is not entered in the register, since no entry key is depressed, i.e., no memory cycle pulse is generated. Upon depression of the entry key of numeral 1, the digit pulse $D_1$ appears at the output of the inverter $I_2$ and in consequence the digit pulse $D_1$ appears at the outputs of the AND gates $A_4$, $A_7$ and $A_{10}$. The flip-flop circuits $F_2$, $F_3$ and $F_4$ are set by the digit pulse $D_1$ and the outputs of the flip-flop circuits $F_2$, $F_3$ and $F_4$ become a logical "1" level after one digit time from the digit pulse $D_1$. Since the digit pulse $D_2$ is being applied to the reset terminals of the flip-flop circuits, the flip-flop circuits are reset after one digit time from the digit pulse $D_2$. In this case, the outputs of the flip-flop circuits $F_2$, $F_3$ and $F_4$ are at a logical "1" level only during one digit time of the pulse $D_2$. Since no digit pulse $D_1$ is applied to the set terminal of the flip-flop $F_1$, the output Q of the flip-flop circuit $F_1$ is zero. As a result, the outputs of the flip-flop circuits $F_1$, $F_2$, $F_3$ and $F_4$ are 0, 1, 1 and 1, respectively. These outputs of the flip-flop circuits are applied to the AND gates $A_{12}$ and $A_{15}$, the outputs of which are in turn applied to the NOR gate NO1 where they are converted to an output 1 (1000). In the encoder of FIG. 4 the key input is converted by the flip-flop circuits to a pseudo-code which is in turn converted by the NOR gate NO1 to a true-code.

Upon depression of the timer key TM the digit pulse $D_6$ appears at the output of the inverter $I_1$ and thus the digit pulse $D_6$ appears at the output of the AND gate $A_6$ to set the flip-flop circuit $F_2$. When the timer key TM is so depressed, the outputs of the flip-flop circuits $F_1$, $F_2$, $F_3$ and $F_4$ will be 0, 1, 0 and 0 respectively. This pseudo-code is converted by the NOR gate NO1 to a true code 1011 (=13), but it is not entered in the register. When the power level key PL is depressed, a pseudo code 1000 is formed by the flip-flop circuits $F_1$ to $F_4$. Upon depression of the cook key CK a pseudo code 0010 is formed by the flip-flop circuits $F_1$ to $F_4$ and when the door of the microwave oven is opened, a pseudo code 1010 is formed by the flip-flop circuits $F_1$ to $F_4$.

FIG. 5 shows the control signal generator 30. Each output of the flip-flop circuits $F_1$ to $F_4$ is coupled to a NOR gate NO2. When neither the function key nor the entry key is depressed, the output of the NOR gate NO2 becomes "1". When either of these keys is depressed, the output of the NOR gate NO2 becomes "0" and in consequence the output of the inverter $I_4$ becomes "1" to cause an AND gate 16 to generate, at the timing of $D_2$, a signal KEY ($D_2$) indicating that the key has been depressed. The signal KEY ($D_2$) is supplied to the memory cycle pulse generator 70 to form memory cycle pules MCA and MCB as will be later described. When the cook key CK is depressed, a NOR gate NO3 generates an output "1". The output "1" of the NOR gate NO3 is fed through AND gates $A_{17}$ and $A_{18}$ to the set input of a flip-flop circuit $F_5$ to provide at an output Q a signal (CK) of a logical "1" level indicating that the cook key has been depressed. When the door of the electronic oven is opened, a NOR gate NO4 generates an output "1". The output "1" of the NOR gate NO4 is delivered through an AND gate $A_{19}$ and OR gate $O_{12}$ to the reset input of the flip-flop circuit $F_5$ to cause the output Q thereof to be "0". When the timer key TM is depressed, a NOR gate NO5 generates an output "1". The output "1" of the NOR gate NO5 is fed through an AND gate $A_{20}$ and OR gate $O_{13}$ to the set input of a flip-flop circuit $F_6$ to provide at the output Q thereof a signal (TM) of a logical "1" level indicating that the timer key TM has been depressed. When the power level key PL is depressed, a NOR gate NO6 generates an output "1" which is in turn sent through an AND gate 21 to cause the flip-flop $F_6$ to be reset. The set outputs of the flip-flop circuits $F_5$ and $F_6$ are maintained until these flip-flop circuits are reset. The flip-flop circuit $F_6$ is also set by an auto clear signal AC from the clear circuits 140 as will be later described. The flip-flop circuit $F_5$ is also reset when the power level key PL or the timer key TM is depressed or when the power switch is rendered ON.

The flip-flop circuit $F_7$ is set when the cook key CK is depressed or the door of the electronic oven is opened, and reset when the timer key TM or the power level key PL is depressed or when the content of either of the timer shift register 50 and power level shift register 60 is zero. The flip-flop circuit $F_7$, when reset, generates an output L of a logical "1" level. The line KF in FIG. 4 is connected to the set input of a flip-flop circuit $F_8$. When the function key is depressed the flip-flop circuit $F_8$ is set by either one of digit pulses $D_2$, $D_3$, $D_5$ and $D_6$ and reset by the digit pulse $D_1$. A flip-flop circuit $F_9$ is set at the timing of $D_1$ by the output of the flip-flop circuit $F_8$ and reset by a pulse $D_6T_8$. An AND gate $A_{22}$ is connected to the output $\overline{Q}$ of the flip-flop circuit $F_9$ and generates an output $\overline{KF}\cdot MCA$. The output $\overline{KF}\cdot MCA$ becomes "0" when a function key is depressed, and becomes "1" when a numeral key is depressed. An AND gate $A_{23}$ generates a signal $L\cdot\overline{K}\cdot\overline{F}\cdot MCA$ which becomes "1" when a numeral key is depressed after depression of the timer key or the power level key. An AND gate 24 generates a signal (TM)--$L\cdot\overline{KF}\cdot MCA$ which becomes "1" when a numeral key is depressed after depression of the timer key. An AND gate $A_{25}$ generates $L\cdot\overline{KF}\cdot MCA\cdot D_2$.

Figure 6:
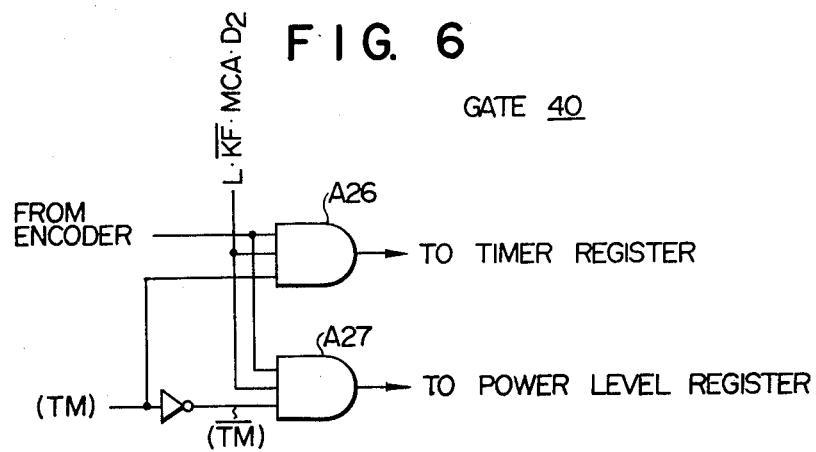
FIG. 6 shows a gate circuit in FIG. 1.

FIG. 6 shows the gate circuit 40. A data input from the encoder 20 and the output $L\cdot\overline{KF}\cdot MCA\cdot D_2$ of the abovementioned AND gate $A_{25}$ is coupled to AND gates $A_{26}$ and $A_{27}$. The time key depression representing signal ($\overline{TM}$) from the flip-flop circuit $F_6$ is coupled to the AND gate $A_{26}$ and the signal (TM) is coupled to the AND gate $A_{27}$. Since the signal (TM) and $L\cdot\overline{KF}\cdot MCA\cdot D_2$ are both at a logical "1" level when a numeral key is depressed after depression of the timer key, the output of the encoder is entered, through the AND gate $A_{26}$, into the timer shift register 50. When the power level key PL is depressed, the flip-flop circuit $F_6$ in FIG. 5 is reset to cause the signal (TM) to become zero. Since the signal $\overline{(TM)}$ is at the logic "1" level, the output of the encoder is entered, through the AND circuit $A_{27}$, into the power level shift register 60. Because the signal $L \cdot \overline{KF} \cdot MCA \cdot D_2$ is zero when a function key is depressed, the function key input from the encoder 20 is not entered into either of the registers. Since the signal L is an output $\overline{Q}$ of the flip-flop circuit $F_7$ in FIG. 5 it becomes zero when the flip-flop circuit $F_7$ is reset by the depression of the cook key CK. Therefore, even if a numeral key is depressed after depression of the cook key, the numeral data of the key being depressed is not entered into the register. The same is true when the door of the electronic oven is opened.

Figure 7:
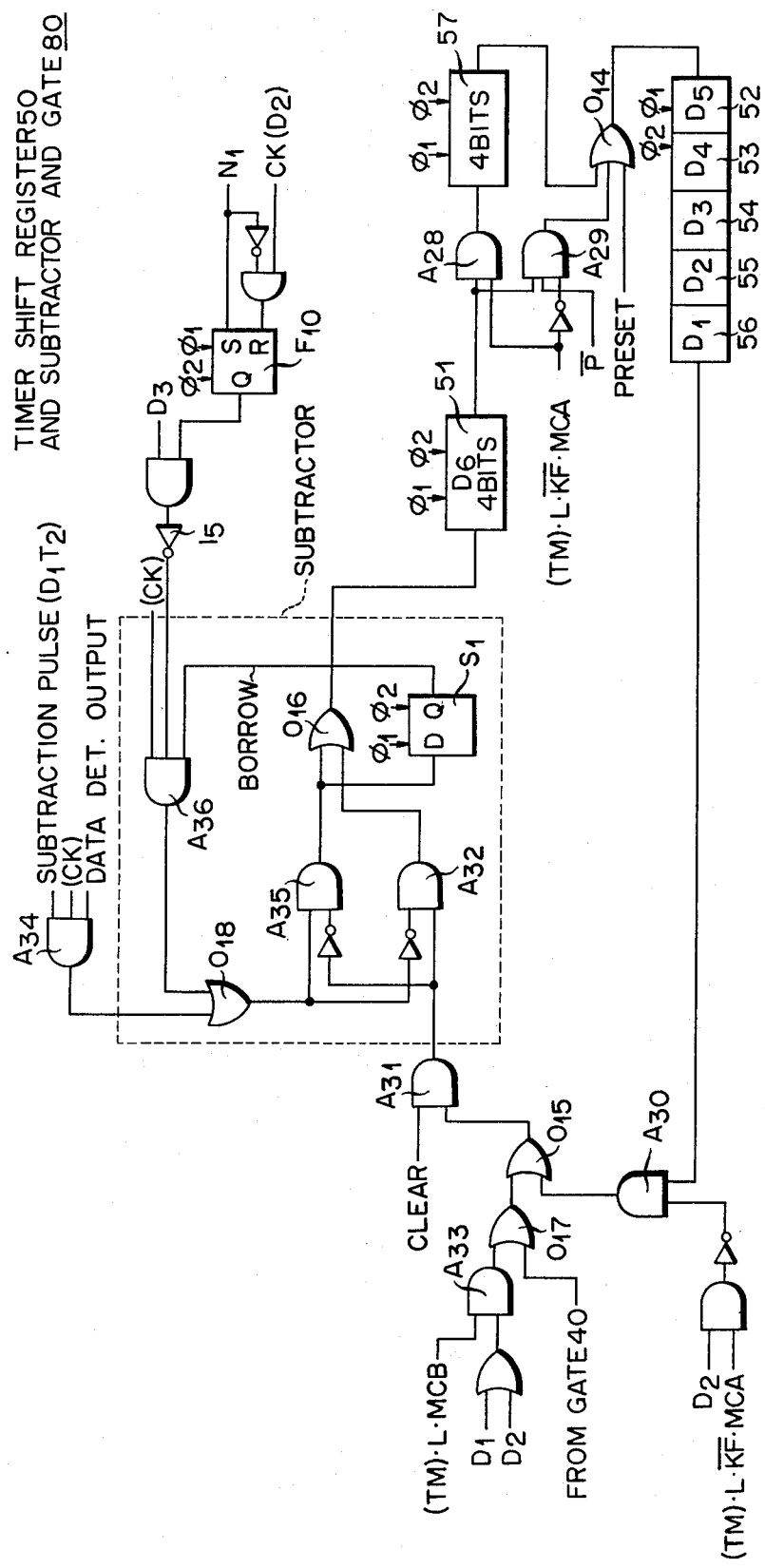
FIG. 7 shows a timer shift register and subtractor/gate circuit in FIG. 1.

The timer shift register 50 and subtractor and gate circuit 80 will be explained below by referring to FIG. 7.

The timer shift register 50 includes $D_6$, $D_5$, $D_4$, $D_3$, $D_2$ and $D_1$ digit stages 51, 52, 53, 54, 55 and 56 and a digit stage 57 for one-digit shifting at the numeral data entry time. Since an normal state other than at the entry time, the signal $(TM) \cdot L \cdot \overline{KF} \cdot MCA$ from the AND gate $A_{24}$ in FIG. 5 is zero. An AND gate $A_{28}$ is disabled and an AND gate 29 is enabled. Accordingly the content of the timer shift register 50 is circulated through the AND gate $A_{29}$, OR gate $O_{14}$, AND gate $A_{30}$, OR gate $O_{15}$, AND gate $A_{31}$, AND gate $A_{32}$ and OR gate $O_{16}$. Since at the entry time the signal $(TM) \cdot L \cdot \overline{KF} \cdot MCA$ is at the logical "1" level, the AND gate $A_{28}$ is enabled and the AND gate 29 is disabled. As a result, the digit stage 57 is coupled between the $D_6$ stage 51 and the $D_5$ stage 52 so that shift by one-digit place can be effected at the entry time. At the entry time, the AND gate $A_{30}$ is disabled at the timing of $D_2$ and thus the content of the $D_2$ stage 55 is erased. A time data from the gate circuit 40 is entered at the timing of $D_2$ into the $D_6$ digit stage 51 through OR gate $O_{17}$, OR gate $O_{15}$, AND gate $A_{31}$, AND gate $A_{32}$ and OR gate $O_{16}$. After one memory cycle, the content of the $D_6$ digit stage 51 is stored in the $D_3$ digit stage 54. After completion of entry, a tens minute data is present in the $D_6$ stage 51; a units minute data, in the $D_5$ stage 52; a tens second data, in the $D_4$ stage 53; and a units second data, in the $D_3$ stage 54. Because at completion of entry a signal $(TM) \cdot L \cdot MCB$ is at a logical "1" level, an AND gate $A_{33}$ is enabled and thus the data 15 (1111) is stored in the $D_2$ and $D_1$ stages 55 and 56 by the digit pulses $D_1$ and $D_2$. When the power source is thrown ON or the timer key TM is depressed a CLEAR signal is at a logical "0" level, the AND gate $A_{31}$ is disabled and thus the time shift register 50 is cleared. By depression of an entry key the CLEAR signal becomes a logical "1" level to enable the AND gate $A_{31}$.

The count down operation of the timer shift register 50 will now be explained below.

When a time data and power level setting data are entered in the timer shift register 50 and power level shift register 60, the output of the data detector 210 becomes a logical "1" level. When in this state the cook key is depressed, (CK) signal becomes "1". As a result, an AND gate $A_{34}$ is enabled and one subtraction pulse $D_1T_2$ per fiftieth or sixtieth second is supplied to the subtractor. The subtraction pulse is generated at the timing of $D_1T_2$. The subtractor compares the subtraction pulse with the content of the twos bit position in the $D_1$ stage 56. Where the subtraction pulse appears at the output of an OR gate $O_{18}$ the content of the twos bit ($T_2$) position of the $D_1$ stage 56 appears at the output of the AND gate $A_{31}$. When the outputs of the OR gate $O_{18}$ and AND gate $A_{31}$ are both at the logical "1" level the outputs of the AND gates $A_{32}$ and $A_{35}$ are both at the logical level "0". Accordingly, when the content of the $D_1$ stage 56 is entered in the $D_6$ stage the content in the twos bit position of the $D_6$ stage 51 becomes a logical "0" level. When the output of the OR circuit $O_{18}$ is at the logical "1" level and the output of the AND gate $A_{31}$ at the logical "0" level, the AND gate $A_{35}$ generates an output "1" which is fed through the OR gate $O_{16}$ to the $D_6$ stage 51. That is, the content in the twos bit position of the $D_{16}$ stage becomes "1". The output "1" of the AND gate $A_{35}$ is applied to one-bit shift register $S_1$ and the output "1" of the shift register $S_1$ is fed as a borrow digit to the OR gate $O_{18}$ through an AND gate $A_{36}$. Then, the borrow digit is compared with the content in the fours bit position of the $D_1$ stage 56. When the output of the OR circuit $O_{18}$ is zero, the AND gate $A_{32}$ is enabled and the content in the $D_1$ stage 50 is delivered to the $D_6$ stage 51.

As will be evident from the foregoing subtractor permits an output "0" to be delivered to the $D_6$ stage 51 when the outputs of the OR circuit $O_{18}$ and AND gate $A_{31}$ are both at a "1" level, permits a borrow to occur and an output "1" to be supplied to the $D_6$ stage 51 when the output of the OR circuit $D_{18}$ is at a "1" level and the output of the AND gate $A_{31}$ is at a "0" level, and permits an output "1" or "0" to be delivered to the $D_6$ stage 51 according to the content of the $D_1$ stage 56 when the output of the OR circuit $O_{18}$ is at a "0" level. In the $D_1$ and $D_2$ stages are preset such numbers that down count operation of the $D_1$ and $D_2$ stages by the number of subtraction pulses occurring during one second permits to subtract one second from the units second data stored in the $D_3$ stage 54. At the completion of entry, 15(1111) are set in the $D_1$ and $D_2$ stages as mentioned above, but by the preset circuit 150 as will be later described a data in the $D_2$ stage is converted to 9 (1001) and a data in the $D_1$ stage is converted to 9 in the case of a 50 Hz power source frequency and to 11(1101) in the case of 60 Hz power source frequency. As a consequence in the case of the 50 Hz power source frequency a borrow as subtracting one second from a data in the $D_3$ stage occurs by fifty substraction pulses per second and in the case of 60 Hz power source frequency a borrow as subtracting to one second from a data in the $D_3$ stage occurs by sixty subtraction pulses per second. In the 50 Hz power source frequency the down count operation will be evident from FIG. 8. FIG. 8 shows the case where 1(1000), that is, one second is stored in the $D_3$ stage.

Upon depression of the cook key CK a flip-flop circuit $F_{10}$ is reset, causing an output of an inverter $I_5$ to become "1" to enable the AND gate $A_{36}$. As a result, a borrow signal is supplied from the shift register $S_1$ to the AND gate $A_{35}$ to permit a down count operation. As will be evident from FIG. 5, when the timer key TM or the power level key is depressed during the down count operation or when the door of the oven is opened the (CK) signal becomes zero, causing the AND gate $A_{36}$ to be disabled. Since a supply of a borrow to the AND gate $A_{35}$ is stopped the down count operation is stopped. When the power level key is depressed or the door of the oven is opened the content in the timer shift register is held and upon again depressing the cook key the down count operation is restarted. Since, however, a CLEAR signal becomes zero upon depression of the timer key the content in the timer shift register is erased.

When an erroneous time data is entered in the timer shift register the flip-flop circuit $F_{10}$ is set by an output $N_1$ of the error entry detection circuit 170. As a result, the output of the inverter $I_5$ becomes zero at the timing of $D_3$ to cause the AND gate $A_{36}$ to be disabled and a supply of a borrow to the AND gate $A_{36}$ is interrupted during the digit pulse $D_3$ time. This means that in the erroneous entry the $D_1$ and $D_2$ stages undergo a down count operation, but that the cooking time data in the timer shift register 50 is not counted down.

Figure 9:
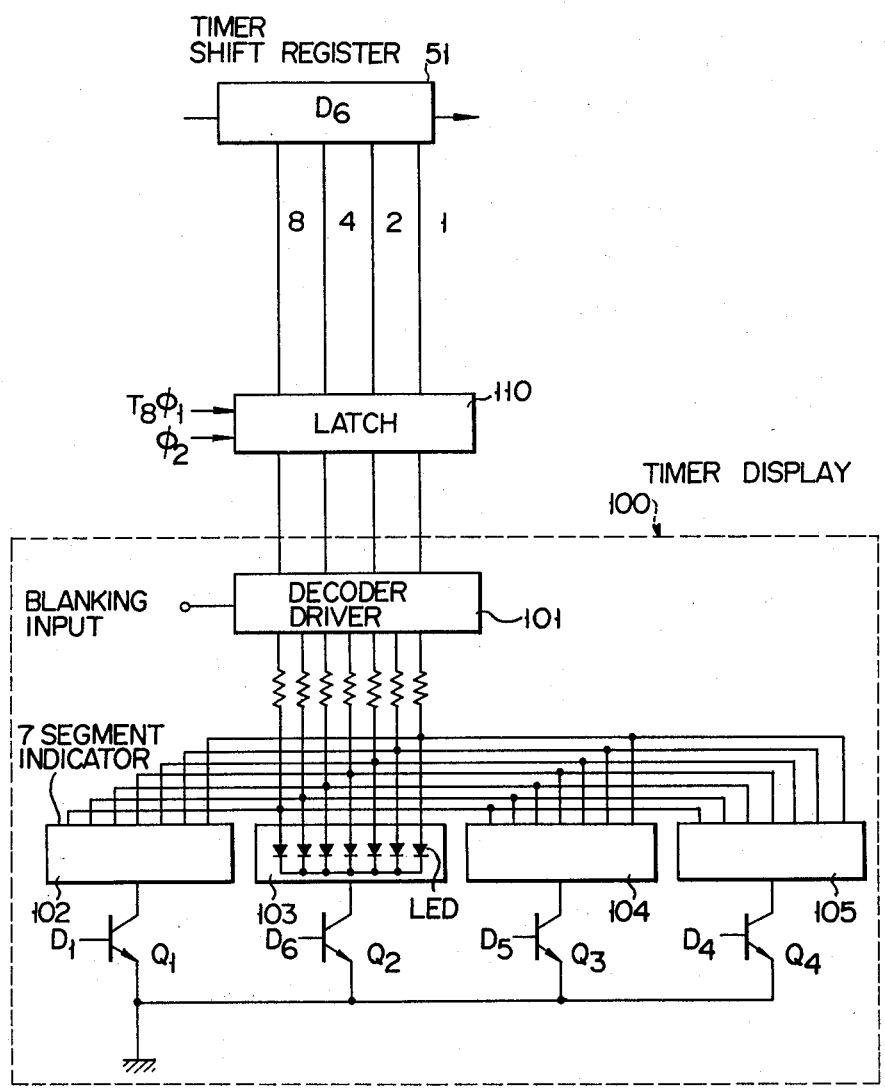
FIG. 9 shows an indicating circuit for displaying a time data in a timer shift register in FIG. 1.

FIG. 9 shows the display 100 for displaying a data in the timer shift register 50. The latch circuit 110 is connected to the $D_6$ stage 51 in the timer shift register and adapted to receive a pulse $T_8\phi_1$ as a read-in pulse and a pulse $\phi_2$ as a readout pulse. A data in the $D_6$ stage 51 appears at the output of the latch circuit 110 with a one-digit time delay. A known decoder driver 101 having a blanking input is connected to the outputs of the latch circuit 110. The outputs of the decoder divider 101 are connected to seven-segment digital indicators 102, 1043, 104 and 105 each having light-emitting-diodes. The indicators 102, 103, 104 and 105 are adapted to display tens minute data, units minute data, tens second data and units second data, respectively. The indicators 102, 103, 104 and 105 are connected respectively through transistors $Q_1$, $Q_2$, $Q_3$ and $Q_4$ to ground. The digit pulse $D_1$ is applied to the base of transistor $Q_1$, the digit pulse $D_6$ to the base of transistor $Q_2$, the digit pulse $D_5$ to the base of transistor $Q_3$ and the digit pulse $D_4$ to the base of transistor $Q_4$.

At the timing of $D_1$ tens minute data appears at the outputs of the latch circuit 110. Since at this time the transistor $Q_1$ is turned ON the indicator 102 displays the tens minute data. Since at the timing of $D_6$ units minute data appears at the outputs of the latch circuit 110 the indicator 103 displays the units minute data. The tens second data and units second data are displayed at the timing of $D_5$ and $D_4$, respectively.

Figure 10:
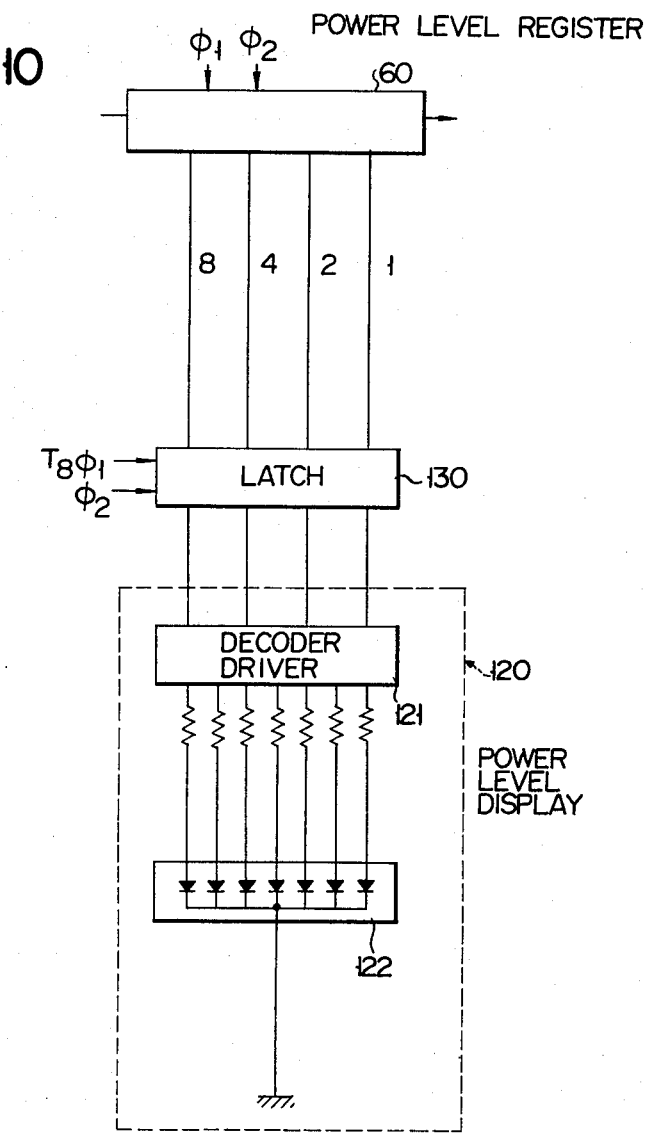
FIG. 10 is an indicating circuit for displaying a power level setting data in a power level shift register in FIG. 1.

FIG. 10 shows the display 120 for displaying a data in the power shift register 60. The latch circuit 130 is connected to the outputs of the power level shift register 60. A decoder driver 121 is connected to the outputs of the latch circuit 130 and the output of the decoder 121 is grounded through a 7-segment indicator 122 constituted of light emitting diodes.

The display of the timer shift register 50 of FIG. 9 is of a dynamic type and the display of the power level shift register 60 of FIG. 10 is of a static type. However, a dynamic type display can be used for the power level shift register. In this case, a transistor is connected between the indicator 122 and ground and one of digit pulses $D_1$ to $D_6$ may be supplied to the base of this transistor.

FIG. 11 shows the clear circuit 140. When the power switch is rendered ON, a power supply circuit 141 generates a pulse to cause a flip-flop circuit $F_{11}$ to be set. The flip-flop circuit $F_{11}$ generates an AUTO CLEAR signal of a "1" level, enabling an AND gate $A_{37}$ to permit 9(1001) to be set in the power level shift register 60 by bit pulses $T_1$ and $T_8$. A desired power level setting data as set by an entry key after depression of the power level key can be entered into the shift register 60 through an OR circuit $O_{19}$. A flip-flop circuit $F_{12}$ is set by the AC signal from the flip-flop circuit $F_{11}$ to generate a CLEAR signal of a logical "O" level at the $\overline{Q}$ output thereof, disabling the AND gate $A_{31}$ in FIG. 7 to clear the timer shift register 50. It will be apparent that because the flip-flop circuit $F_{12}$ can be set even by a signal TM($D_2$) representing the depression of the timer key the timer shift register 50 is cleared by the depression of the timer key. That is, the timer key is used as a clear key. The flip-flop circuit $F_{11}$ is reset by a signal MCA as obtained by the depression of a key. From this it will be clear that during entry the AND circuit $A_{37}$ is disabled. The flip-flop circuit $F_{12}$ is reset by the signal $\overline{KF}\cdot MCA$ from the AND gate $A_{22}$ in FIG. 5 which represents the depression of an entry key. It will be evident that during entry the AND gate $A_{31}$ (FIG. 7) is enabled to cause a time data as set at the keyboard to be entered in the timer shift register.

FIG. 12 shows the preset circuit 150. All the bits of each stage in the timer shift register 50 become zero during the down count operation and then become one upon receipt of next borrow. The preset circuit 150 is adapted to detect such a state that all the bits of the stage are one and preset a predetermined number in the stage. That is, 9 is preset in the $D_5$ stage for the units minute data; 5, in the $D_4$ stage for the tens second data; 9, in the $D_3$ stage for the units second data; 9, in the $D_2$ stage for the tenths-second data; and 9 (in the case of the 50 Hz power source frequency), in the $D_1$ stage for the fiftieth of sixtieth second data and 11 (in the case of the 60 Hz power source frequency), in the $D_1$ stage.

In FIG. 12 an AND gate $A_{39}$ detects that all the bits of the $D_6$ stage 51 are one. For example, a data in the $D_1$ stage 56 is entered at the timing of $D_1$ in the $D_6$ stage 51. If, therefore, all the bits of the $D_1$ stage 56 are one, the AND gate $A_{39}$ generates an output "1" during the $D_{10}T_4$ to $D_1T_9$ time period. The output of the AND gate $A_{39}$ is read by a $T_8\phi_1$ pulse into a shift register $S_2$ and read by a $\phi_2$ pulse out of the shift register $S_2$. In consequence the output of the shift register $S_2$ is held at a "1" level during the digit pulse $D_2$ time period, enabling an AND gate $A_{40}$. The output of an inverter $I_6$ becomes zero during the digit pulse $D_2$ time period, disabling the AND gate $A_{29}$ (FIG. 7) to cause the content 1111 in the $D_1$ stage 56 to be erased. An AND gate $A_{42}$ is enabled by the digit pulse $D_2$ through OR gates $O_{21}$ and $O_{22}$ from an AND gate $A_{41}$ to provide an output of 9(1001) at the output of AND gate $A_{40}$ by the bit pulses $T_1$ and $T_8$. The output of AND gate $A_{40}$ is coupled to the OR gate $O_{14}$ in FIG. 7. This means that the content in the $D_6$ stage 51 (all the bits are one) has been converted to 9 when shifted at the timing of $D_2$ to the $D_5$ stage 52. The AND gate $A_{42}$ is enabled by the digit pulses $D_3$, $D_4$ and $D_6$, too and, thus when all the bits of each of the $D_2$, $D_3$ and $D_5$ stages 55, 54 and 52 are one, these stages are preset to 9, respectively. Since an AND gate $A_{43}$ is enabled by the digit pulse $D_5$, the $D_4$ stage 53 is preset by bit pulses $T_1$ and $T_4$ to 5 when all the bits of the $D_4$ stage 53 are one. A switch $SW_1$ is adapted to switch the preset value of the $D_1$ stage to 9 or 11 according to the power source frequency. When the switch $SW_1$ is in a position shown in FIG. 12 the AND gate $A_{41}$ is enabled to cause 9 to be preset to the $D_1$ stage as mentioned above. When the switch $SW_1$ is thrown to the other side, an AND gate $A_{44}$ is enabled and the AND gate $A_{41}$ is disabled. In consequence a data 11(1101) is preset by bit pulses $T_1$, $T_2$ and $T_8$ in the $D_1$ stage. The switch $SW_1$ is inaccessible to the user.

Figure 13:
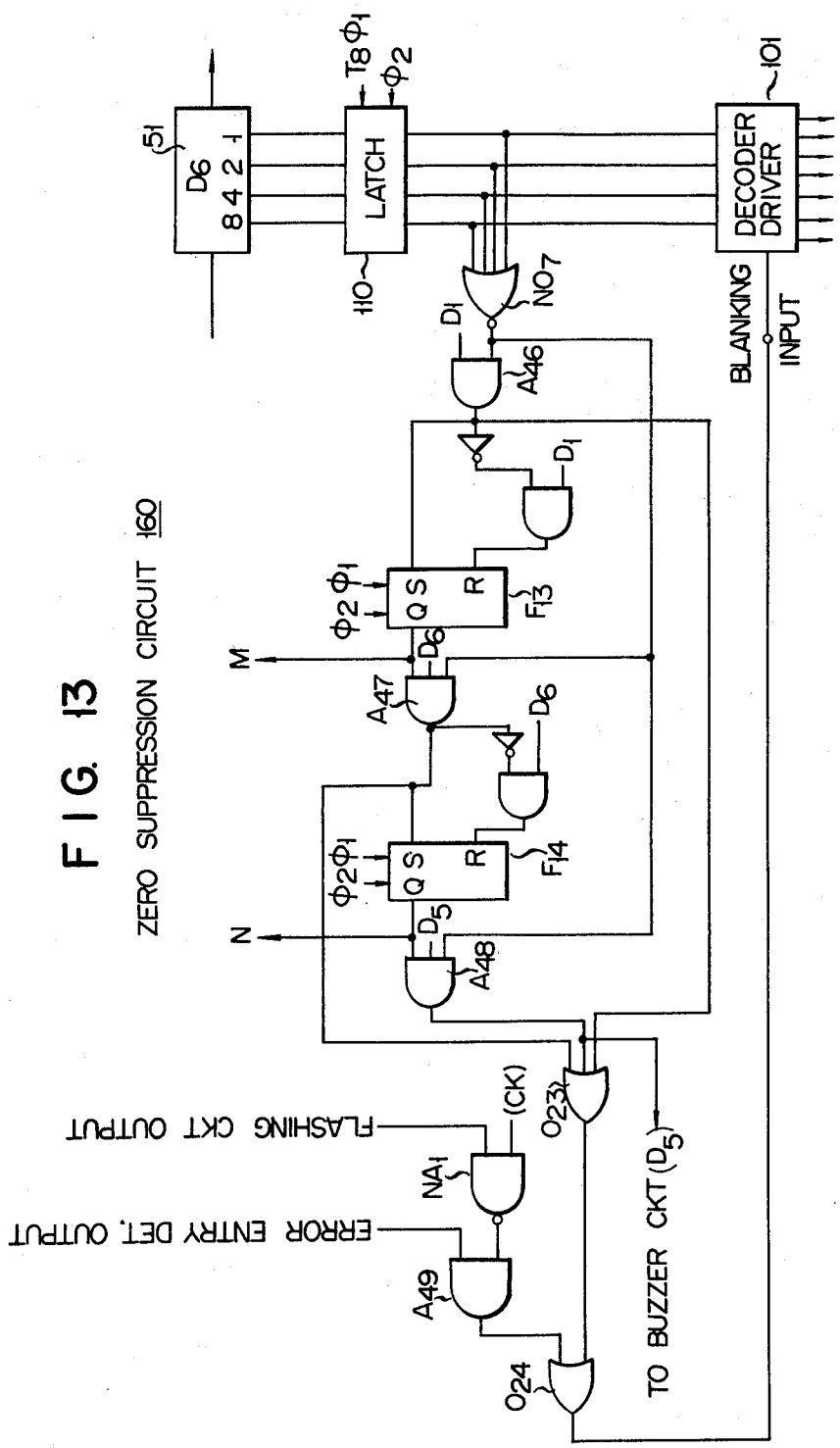
FIG. 13 shows a zero suppression circuit in FIG. 1.

FIG. 13 shows the zero suppression circuit 160. At the timing of $D_6$ a tens minute data is present in the $D_6$ stage 51. When the tens minute data is zero the bit outputs of the latch circuit 110 become zero during the digit pulse $D_1$ time period after the one-digit time. Because at this time the output of the NOR gate NO7 becomes 1, the output of an AND circuit $A_{46}$ becomes 1 during the digit pulse $D_1$ period. The output "1" of the AND gate $A_{46}$ is supplied through OR gates $O_{23}$ and $O_{24}$ to the blanking input of the decoder driver 101 to blank the tens minute data of "0". A flip-flop circuit $F_{13}$ is set by the output "1" of the AND gate $A_{46}$ to generate an output "1". A units minute data is fed at the timing of $D_5$ to the $D_6$ stage 51. With a one-digit time delay the units minute data appears at the timing of $D_6$ at the outputs of the latch circuit 110. When the units minute data is zero the output of the NOR gate NO7 becomes "1" and thus during the digit pulse $D_6$ period an AND gate $A_{47}$ generates an output "1". The output "1" of the AND gate $A_{47}$ is connected to the blanking input of the decoder driver 101 to cause the units minute data "0" to be blanked. If the units minute data is not zero, the output of the NOR gate NO7 is zero and in consequence the output of the AND gate $A_{47}$ is zero. In this case, the units minute data is displayed. When the tens minute data and units minute data are both "0", a flip-flop circuit $F_{14}$ is set by the output of the AND gate $A_{47}$. A tens second data is entered at the timing of $D_4$ in the $D_6$ stage 51 and it appears at the timing of $D_5$ at the outputs of the latch circuit 110. When the tens second data is "0" the output of the NOR gate NO7 is at a level "1" and thus an AND gate $A_{48}$ generates a "1" level output at the timing of $D_5$. In consequence, when the respective tens minute, units minute and tens second data are zero the "0" of the tens second data is blanked. When the units minute data is not "0" even if the tens second data is "0" the output of the AND gate $A_{47}$ is at a "0" level. Accordingly, since the flip-flop circuit $F_{14}$ is not set the "0" of the tens second data is displayed. When the respective tens minute, units minute, tens second and units second data are zero, the tens minute, units minute and tens second data are blanked, but the units second data of "0" is displayed.

Figure 14:
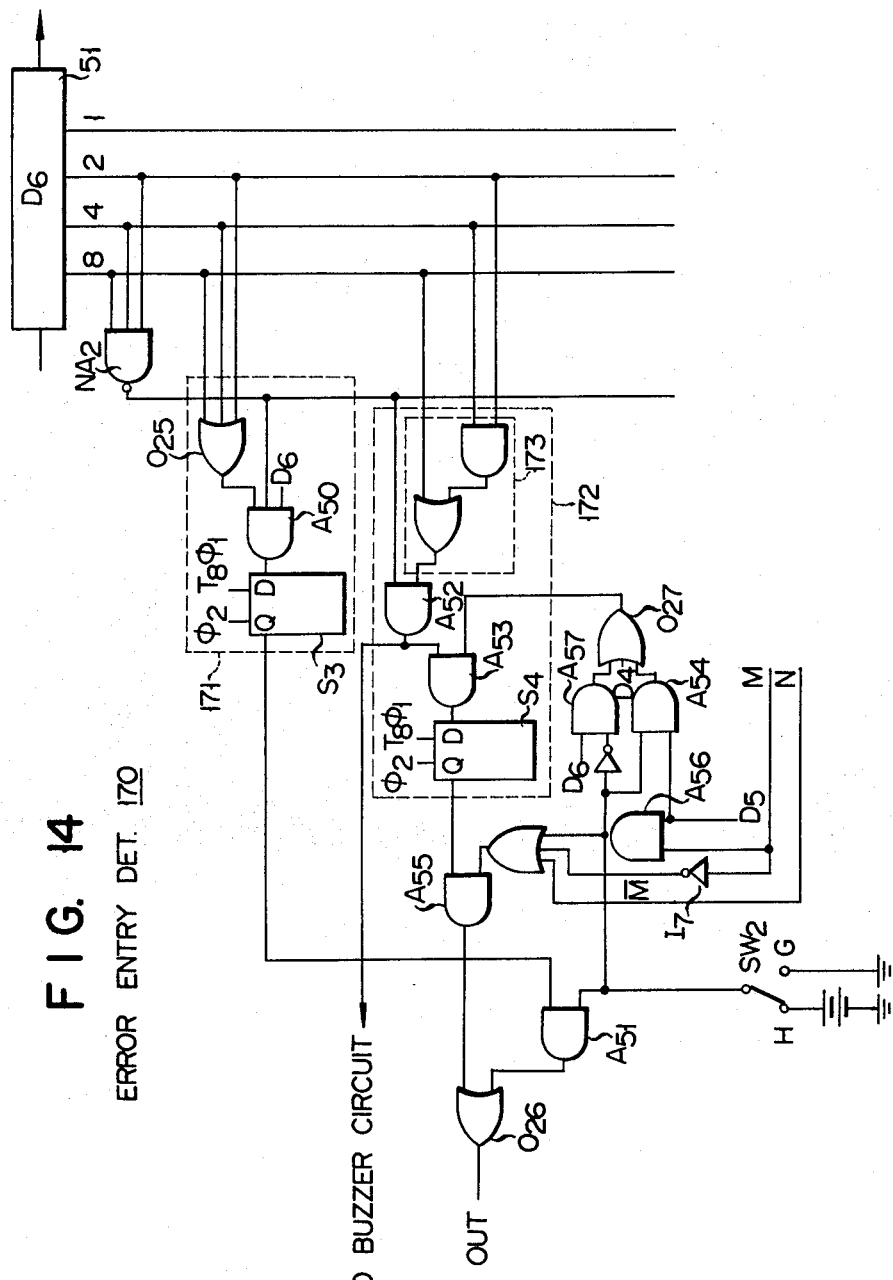
FIG. 14 is an error entry detector in FIG. 1.

FIG. 14 shows the error entry detector 170. The maximum time settable in the timer shift register 50 can be set to either one of the times "15 minute and 59 second" and "59-minute and 59-second" by a switch $SW_2$. The switch position shown in FIG. 14 selects the time "15-minute and 59-second". The switch $SW_2$ is also inaccessible by the user.

When the maximum time "15-minute and 59-second" is set the error entry detector 170 detects whether the tens minute data is two or more or whether the units minute and tens second data are, respectively, 6 or more. When the maximum time "59-minute and 59-second" is selected, the error entry detector 170 detects each of the tens minute and tens second data is six or more. Accordingly the error entry detector 170 includes a circuit 171 for detecting a data of 2 or more and a circuit 172 for detecting a data of 6 or more.

Suppose that the maximum time "15-minute and 59-second" is set. When in this case two or more tens minute data are fed at the timing of digit pulse $D_6$ to the $D_6$ stage 51 the output of an OR gate $O_{25}$ becomes "1", enabling an AND gate $A_{50}$. In consequence the output of the AND gate $A_{50}$ becomes "1" during the digit pulse $D_6$ time period. The "1" level output of the AND gate $A_{50}$ is fed to a shift register $S_3$ adapted to receive a $T_8\phi_1$ pulse as a read-in pulse and a $\phi_2$ pulse as a readout pulse. In consequence the output of the shift register $S_3$ is at a "1" level during the digit pulse $D_1$ period. The "1" level output of the shift register $S_3$ is applied to an AND gate $A_{49}$ in FIG. 13 through an AND gate $A_{51}$ being enabled by the $SW_2$ and through an OR gate $O_{26}$. Since the output of the AND gate $A_{49}$ is coupled through the OR circuit $O_{24}$ to the blanking input of the decoder driver 101, two or more tens minute data is blanked.

When in the case of the maximum time "15-minute and 59-second" the units minute data is 6 or more the output of circuit 173 becomes "1", enabling an AND gate $A_{52}$ to generate an output "1". As a result, an AND gate $A_{53}$ is enabled. Since AND gate $A_{54}$ is enabled by the switch $SW_2$ the digit pulse $D_5$ is applied through an OR $O_{27}$ to the AND gate $A_{53}$. Accordingly, the output of the AND gate $A_{53}$ is at a "1" level during the digit pulse $D_5$ period. The output "1" of the AND gate $A_{53}$ is applied to a shift register $S_4$ adapted to receive a $T_8\phi$ pulse as a read-in pulse and a $\phi_2$ pulse as a readout pulse. The output of the shift register is at a "1" level during the $D_6$ digit pulse period.

To the error entry detector 170 are applied from the zero suppression circuit 160 the output M of the flip-flop circuit $F_{13}$ (FIG. 13) which becomes "1" when the tens minute data is zero, as well as the output N of the flip-flop circuit $F_{14}$ (FIG. 13) which becomes "1" when the tens minute and units minute data are both zero.

When in the case of the maximum time "15-minute and 59-second" the tens minute data is 1 or more an AND gate $A_{55}$ is enabled due to the presence of an inverter $I_7$. The output of the AND gate $A_{55}$ is at a "1" level during the digit pulse $D_6$ period, since the output of the shift register $S_4$ is at a "1" level when the units minute data is 6 or more. The output "1" of the AND gate is fed through the OR gate $O_{26}$ to the blanking input of the decoder driver 101 to blank 6 or more units minute data. The same thing is applied to the case where the tens minute data is 1, or 2 or more. However, in a case where the tens minute data is zero, even if the units minute data is 6 or more, the units minute data is not judged as an erroneously entered number. In a case where the tens minute data is zero, since the M signal is 1, the output of an AND gate $A_{56}$ is at a "1" level during the digit pulse $D_5$ period. Since the digit pulse $D_5$ is supplied through the AND gate $A_{54}$ and OR gate $O_{27}$ to the AND gate $A_{53}$, even when the units-minute data is 6 or more, the output of the AND gate 53 produces a "1" level output during the digit pulse $D_5$ period when the units minute data is 6 or more. In consequence, the output of the shift register $S_4$ is at a "1" level during the digit pulse $D_6$ period. For this reason, digit pulse $D_5$ and $D_6$ are applied to the AND gate $A_{55}$. Since, however, these digit pulses $D_5$ and $D_6$ are displaced in time from each other, the AND gate $A_{55}$ generates no "1" level output. As a result, when the tens minute data is zero, 6 or more units minute data is displayed. Next when the tens second data is 6 or more, the output of the AND gate $A_{53}$ is at a "1" level during the digit pulse $D_4$ period and the output of the shift register $S_4$ is at a "1" level during the digit pulse $D_5$ period. Since the AND gate $A_{55}$ is enabled by the N signal when the tens minute and units minute data are both zero, by an $\overline{M}$ signal when the tens minute data is not zero, and by the digit pulse $D_5$ when the tens minute data is zero. When the tens second data is 6 or more, the AND gate $A_{55}$ produces a "1" level output during the digit pulse $D_5$ period. That is, even when the tens minute and units minute data take any number, respectively, 6 or more tens second data is judged as an error entry and not displayed. When the maximum time is set to "59-minute and 59-second", the AND gate $A_{51}$ is disabled and the output of the detection circuit 171 adapted to detect a data of 2 or more is not supplied to the OR gate $O_{26}$. Since in the case of the maximum time "59-minute and 59-second", an AND gate $A_{57}$ is enabled, the AND gate $A_{53}$ produces a "1" level output during the digit pulse $D_6$ period when the tens minute data is 6 or more. Accordingly, the shift register $S_4$ generates an output "1" during the digit pulse $D_1$ period. Since the AND gate $A_{55}$ is being enabled by the $\overline{M}$ signal, it generates an output "1" during the digit pulse $D_1$ period and in consequence 6 or more tens minute data is not displayed.

In the case of 6 or more tens second data, the AND gate $A_{53}$ generates an output "1" during the digit pulse $D_4$ period and thus the shift register $S_4$ generates an output "1" during the digit pulse $D_5$ period. The AND gate $A_{55}$ generates an output "1" during the digit pulse $D_5$ period. That is, even when the tens and units minute data are any number 6 or more tens second data is judged as an erroneous data and not displayed.

In the circuit arrangement shown in FIG. 14 an NAND gate NA2 is provided so as not to operate the data detection circuits 171 and 172 when the content in each digit stage becomes 15(1111). That is, when the data is 15, the NAND gate NA2 generates an output "0", disabling the AND gates $A_{50}$ and $A_{52}$.

Figure 15:
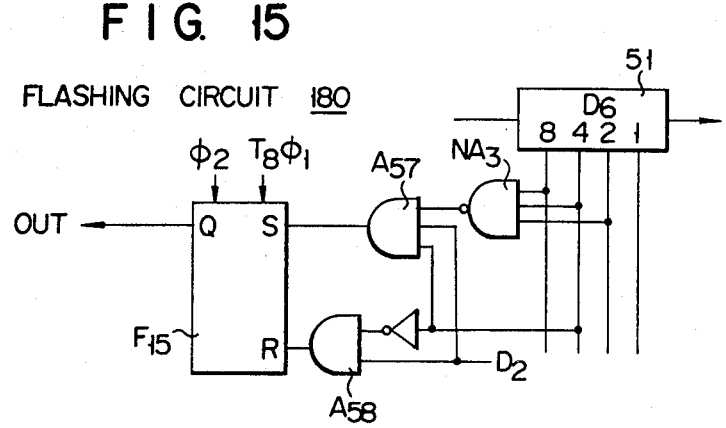
FIG. 15 is a flashing circuit in FIG. 1.

FIG. 15 shows the flashing circuit 180. As will be evident from FIG. 8, during the down count operation the content in the $D_2$ stage i.e., tenths second data, is sequentially varied from 9 to 0 during one second. When the data in the $D_2$ stage is 7, 6, 5 and 4, the fours bit ($T_4$) becomes "1". That is, when the period when the fours bit is "1" continues for four tenth second per second. The data in the $D_2$ stage that is, the tenths second data, is entered in the $D_6$ stage 51 at the timing of $D_2$. When the data in the $D_6$ stage is at least 7, 6, 5 and 4, a NAND gate NA3 generates an output "1". In consequence, when the tenths second data becomes 7, an AND gate $A_{57}$ generates an output "1", setting a flip-flop circuit $F_{15}$. In consequence, the flip-flop circuit $F_{15}$ generates an output "1" at the timing of $D_3$. When the tenths data becomes 3, the fours bit becomes zero and thus an AND gate $A_{58}$ generates an output "1", resetting the flip-flop circuit $F_{15}$. That is, the output "1" of the flip-flop circuit $F_{15}$ continues for four tenth second period i.e. during a time period in which the tenths second data is 7, 6, 5 and 4 and during the remaining six tenth second period the output of the flip-flop circuit $F_{15}$ becomes zero. As shown in FIG. 13 the output of the flip-flop circuit $F_{15}$ is supplied, together with the cook key depression signal (CK), to an NAND gate NA1 the output of which is connected to the AND gate $A_{49}$. That is, when the cook key CK is being depressed, the output of the NAND gate NA1 becomes zero during the four tenth second. The AND gate $A_{49}$ to which the output of the error entry detector is coupled is disabled by the output of the NAND gate NA1 and thus the output of the error entry detector is not coupled to the blanking input of the decoder driver 101 during a four tenth second. In consequence, at time intervals of sixth tenth second an erroneous data is displayed for four tenth second. That is, although when the erroneous data is stored in the timer shift register, it is not displayed by the action of the error entry detector, the erroneous data can be intermittently displayed by depression of the cook key CK under the action of the flashing circuit, thereby clearly informing the user of the number of the erroneous data. Since when all the bits in the $D_6$ stage 51 are "1" the NAND gate NA3 produces an output of a "0" level, the flip-flop circuit $F_{15}$ is not set. As the NAND gate NA3 in FIG. 15 the NAND gate NA2 in FIG. 14 may be used.

Figure 16:
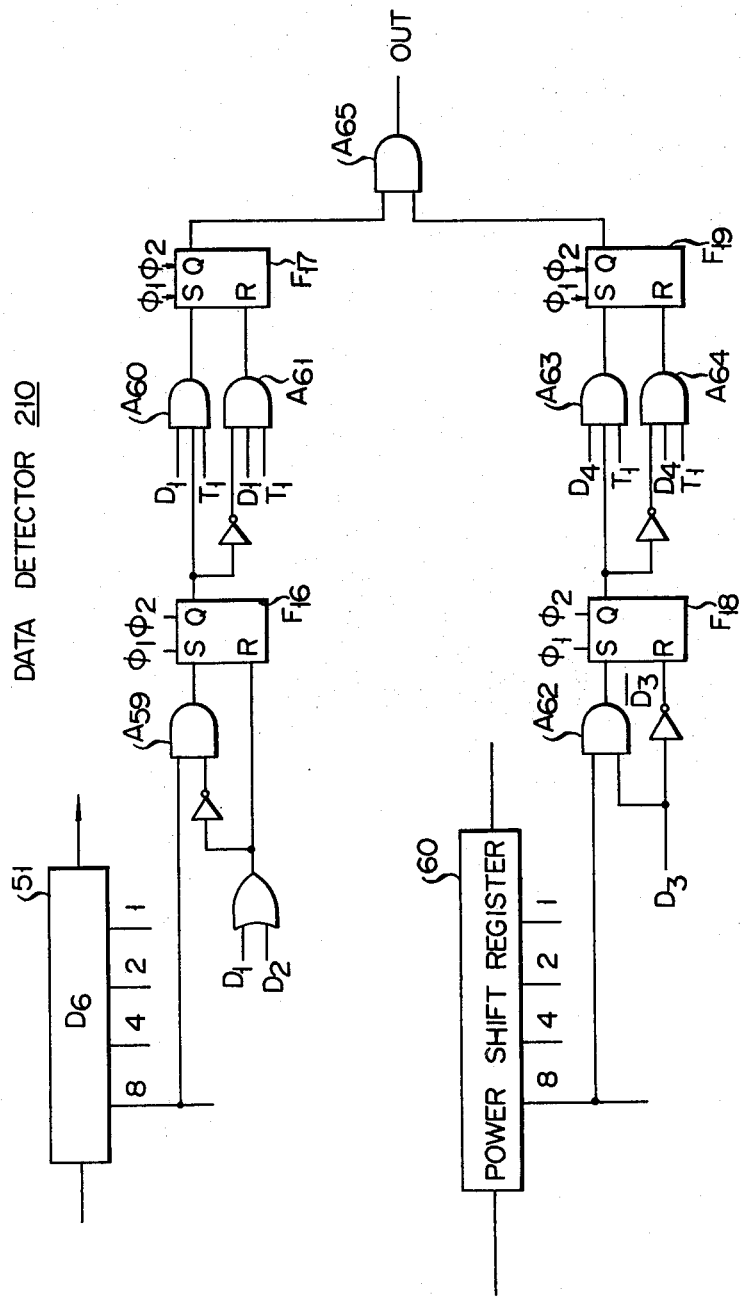
FIG. 16 is a data detector in FIG. 1.

FIG. 16 shows the data detector 210. Since a flip-flop circuit $F_{16}$ is reset by digit pulse $D_1$ or $D_2$ the Q output thereof is necessarily rendered zero at the timing of $D_1 \cdot T_2$. In a case where a data other than "0" is stored in either of the $D_6$, $D_5$, $D_4$ and $D_3$ stages in the timer shift register 50 an AND gate $A_{59}$ generates an output "1" during the digit pulse $D_3$ to $D_6$ period, thereby setting the flip-flop circuit $F_{16}$ to produce "1" level output. The output "1" of the flip-flop circuit $F_{16}$ continues up to $D_1 \cdot T_1$ time. An AND gate $A_{60}$ generates an output "1" at the timing of $D_1 \cdot T_1$, setting a flip-flop circuit $F_{17}$ to produce an output "1" from the timing of $D_1 \cdot T_2$. Since the flip-flop circuit $F_{16}$, when set, generates an output "1" at least during the $D_1 \cdot T_1$ time an AND gate 61 generates no output "1". In consequence, the flip-flop circuit $F_{17}$ maintains the output "1" without being reset as long as the data other than "0" is present in at least on of the $D_6$, $D_5$, $D_4$ and $D_3$ stages in the timer shift register.

When only data "0" is stored in the $D_6$, $D_5$, $D_4$ and $D_3$ stages in the timer shift register the flip-flop circuit $F_{16}$ is not set. Since the flip-flop circuit $F_{17}$ is only reset by an output "1" as generated at the timing of $D_1 \cdot T_1$ from the AND gate $A_{61}$, the output of the flip-flop circuit $F_{17}$ is at a "0" level.

The data detection of the power level shift register 60 will be explained below. The reset input of a flip-flop circuit $F_{18}$ is adapted to receive a $\overline{D_3}$ pulse and in consequence the output of the flip-flop circuit $F_{18}$ becomes zero from the $D_4 \cdot T_2$ time. When a data other than "0" is present in the power level shift register 60 an AND gate $A_{62}$ generates an output "1" during the digit pulse $D_3$ period, setting a flip-flop circuit $F_{18}$ to permit an output "1" to be generated. The flip-flop circuit $F_{18}$ produces, when set, "1" level output at least during the $D_4 \cdot T_1$ period. Accordingly, an AND gate $A_{63}$ produces "1" level output as to set a flip-flop circuit $F_{19}$ to produce "1" level output. The output "1" of the flip-flop circuit $F_{19}$ continues until the flip-flop circuit is reset by an AND gate $A_{64}$. Since, however, the output of the flip-flop circuit $F_{18}$ is at a "1" level during the $D_4 \cdot T_1$ period and AND gate $A_{64}$ generates no output "1". When a data other than "0" is stored in the power level shift register the flip-flop circuit $F_{19}$ is never reset and thus the flip-flop circuit $F_{19}$ maintains the output "1".

When the data of the power level shift register 60 is zero the flip-flop circuit $F_{18}$ is not set and the AND gate $A_{64}$ generates an output "1" at time of $D_4 \cdot T_1$, resetting the flip-flop circuit $F_{19}$ to permit an output "0" to be generated.

The output of the flip-flop circuits $F_{17}$ and $F_{19}$ are coupled to an AND gate $A_{65}$. Accordingly, the AND gate $A_{65}$ produces a "1" level output when the content stored in each of the power shift register 60 and timer shift register 50 is other than zero and produces "0" level output when the content of at least one of these shift registers is zero.

When the content of the timer shift register becomes zero as a result of the down count operation the output of the data detector 210 becomes zero, resetting the flip-flop circuit $F_7$ in FIG. 5 to permit a data entry into the timer shift register 50 and power level shift register 60. The AND gate $A_{34}$ in FIG. 7 is disabled by the output "0" of the data detector 210 to prevent a supply of subtraction pulses to the subtractor. The output of the data detector is coupled to the magnetron control circuit 220.

FIG. 17 shows the magnetron control circuit 220. A flip-flop circuit $F_{21}$ is adapted to receive the output of the error entry detector in FIG. 14 at its set input and the digit pulse $D_2$ at its reset input. In a case where an error data is present in the timer shift register 50 the output of the error entry detector becomes "1" during at least one of the digit pulse $D_1$, $D_5$ and $D_6$ periods to set the flip-flop circuit $F_{21}$. When the flip-flop circuit $F_{21}$ is set the output thereof becomes "1" during at least the digit pulse $D_2$ period and an AND gate $A_{66}$ generates an output "1" to set a flip-flop circuit $F_{22}$ to render the Q output thereof "0" level. An AND gate $A_{68}$ to which the cook key depression signal (CK) and an output of the data detector are coupled is disabled by the output "0" of the flip-flop circuit $F_{22}$ to cause a timer switch 221 coupled to the magnetron 230 to be rendered OFF. In a case where no error data is present in the timer shift register the output of the error entry detector is at a "0" level and the flip-flop circuit $F_{21}$ is not set. In consequence the Q output of the flip-flop circuit $F_{21}$ is at a "0" level and an AND gate $A_{67}$ generates an output "1" during the digit pulse $D_2$ period, resetting the flip-flop circuit $F_{22}$ to permit the $\overline{Q}$ output thereof to become "1". At this time, if the cook key depression signal (CK) and the data detector output coupled to the AND gate $A_{68}$ are both at a "1" level, the timer switch 221 is turned ON to cause the magnetron 230 to be operated.

It will be evident from the circuit arrangement of FIG. 17 that when a time data within the maximum time is correctly entered into the timer shift register 50 and when a power level setting data other than "0" is set to the power level shift register 60, the timer switch 221 is turned ON by depression of the cook key CK to cause the magnetron 230 to be operated. When the content in the timer shift register becomes zero as a result of the down count operation the AND gate $A_{68}$ is disabled to cause the timer switch 221 to be rendered OFF. An output signal $N_1$ of the AND gate $A_{66}$ is connected to the set input of the flip-flop $F_{10}$ in FIG. 7 to prevent of supply of a borrow signal from the shift register $S_1$ to the subtractor when an erroneous data is present in the timer shift register 50.

FIG. 18 shows the buzzer circuit 190 for sounding the buzzer 200 five seconds before completion of the down count operation so as to inform the user that the end of the cooking time is drawing near. Although the buzzer is used in this embodiment, a lamp, bell etc. can be used instead.

Upon depression of the cook key CK the flip-flop circuit $F_{23}$ is reset by the signal CK($D_2$) to generate an output "0". As a result, an AND gate $A_{69}$ is disabled and the buzzer is not sounded. When the units second data is 6 or more an AND gate $A_{70}$ to which the output of the AND gate $A_{52}$ in FIG. 14 is coupled produces an output "1" during the digit pulse $D_3$ period. As a result, a shift register $S_5$ produces an output "1" during the digit pulse $D_4$ period and a shift register $S_6$ generates an output "1" during the digit pulse $D_5$ period. Immediately before completion of the down count operation the tens minute, units minute and tens second data are all zero. In consequence the AND gate $A_{48}$ in the zero suppression circuit 160 in FIG. 13 generates an output "1" during the digit pulse $D_5$ period. The output of the AND gate $A_{48}$ is connected to an AND gate $A_{71}$. When, as mentioned above, units second data is 6 or more the output of the shift register $S_6$ is at a "1" level and the output of an inverter $I_7$ is zero. As a result, the AND gate $A_{71}$ is disabled and thus the flip-flop circuit $F_{23}$ is not set to sound the buzzer 200. When the units second data becomes 5 the output of the AND gate $A_{48}$ in the zero suppression circuit becomes zero and the output of the shift register $S_6$ becomes zero. As a result, the output of the inverter $I_7$ becomes "1" to enable the AND gate $A_{71}$. The output of the AND gate $A_{71}$ becomes "1" during the digit pulse $D_5$ period, setting the flip-flop circuit $F_{23}$ to permit the AND gate $A_{69}$ to be enabled. In consequence, the buzzer 200 is started to sound at five seconds before completion of the down count operation. When the down count operation is completed the data in the timer shift register 50 becomes zero and the output of the data detector becomes zero, disabling the AND gate $A_{69}$. As a result, the sounding of the buzzer 200 is stopped at the end of the down count operation.

Figures 19, 20:
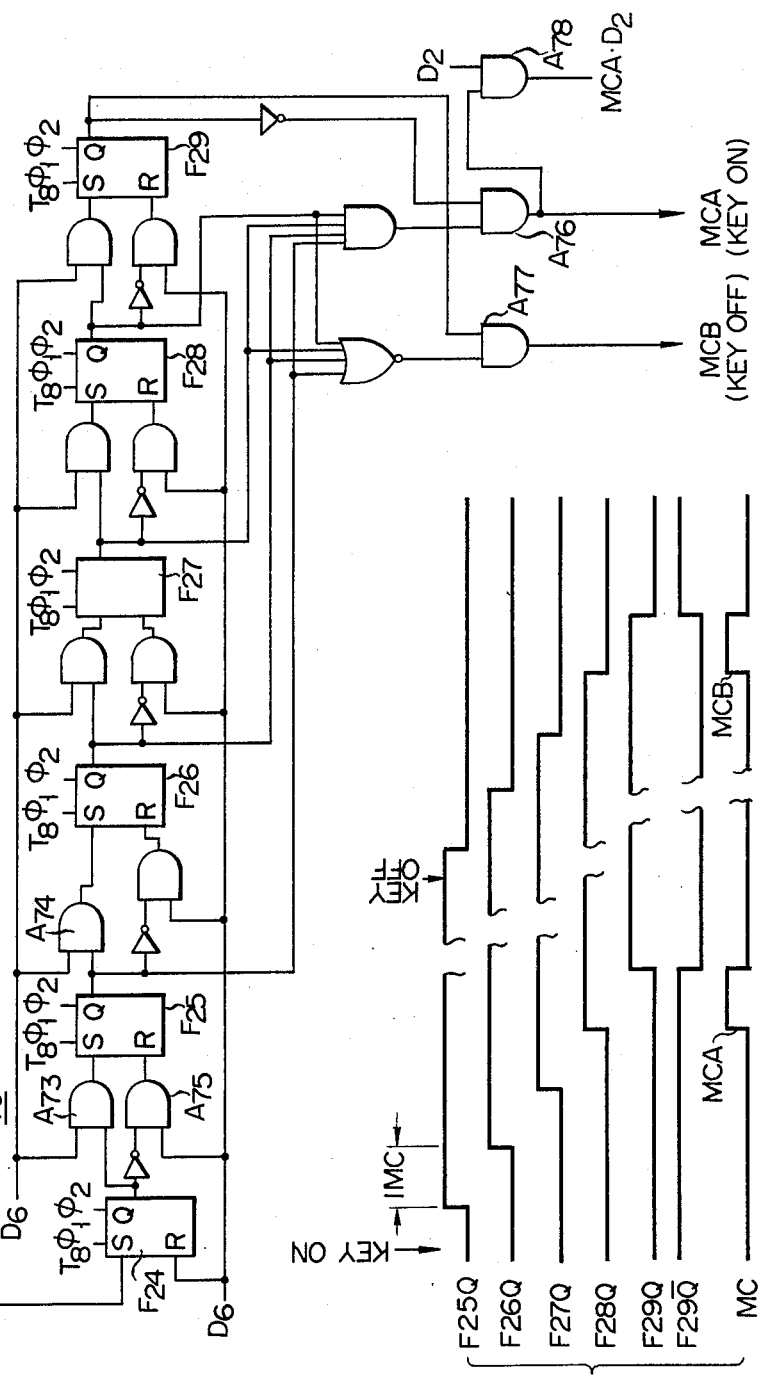
FIG. 19 is a memory cycle pulse generator in FIG. 1.
FIG. 20 is a waveform diagram for explaining the operation of the memory cycle pulse generator in FIG. 19.

FIG. 19 shows the memory cycle pulse generator 70. By depressing a key on the keyboard 10 a key depression signal KEY ($D_2$) is fed at the timing of $D_2$ from the control signal generator 30 to the set input of a flip-flop circuit $F_{24}$ to the reset input of which is applied the digit pulse $D_6$. Accordingly, the Q output of the flip-flop circuit $F_{24}$ becomes "1" during the digit pulse $D_3$, $D_4$, $D_5$ and $D_6$ periods and becomes zero during the digit pulse $D_1$ and $D_2$ periods. As a result, a flip-flop circuit $F_{25}$ is set by the output of an AND gate $A_{73}$ which becomes "1" during the digit pulse $D_6$ period and the Q output of the flip-flop circuit $F_{25}$ becomes "1" from the digit pulse $D_1$ time. A flip-flop circuit $F_{26}$ is set by the output of an AND gate $A_{74}$ one memory cycle time after the flip-flop circuit $F_{25}$ is set and the output of the flip-flop circuit $F_{26}$ becomes "1" with one memory cycle time delay from generation of "1" output by the flip-flop circuit $F_{25}$. In this way, the Q outputs of the flip-flop circuits $F_{25}$, $F_{26}$, $F_{27}$, $F_{28}$ and $F_{29}$ sequentially become "1" with one memory cycle time delay.

After the key depression the flip-flop circuits $F_{25}$ to $F_{29}$ are not reset except for the flip-flop circuit $F_{24}$. When after a key release the flip-flop circuit $F_{24}$ is reset by the digit pulse $D_6$ the Q output thereof becomes zero from the digit pulse $D_1$ time and the output "0" state is continued. The flip-flop circuit $F_{25}$ is reset by the output "1" of an AND gate $A_{75}$ which appears after one memory cycle from the reset time of the flip-flop circuit $F_{24}$, and the Q output thereof becomes zero from the digit pulse $D_1$ time.

After the key release the flip-flop circuits $F_{25}$, $F_{26}$, $F_{27}$, $F_{28}$ and $F_{29}$ sequentially become zero with one memory cycle time delay as shown in FIG. 20. It will be apparent that after the key depression an AND gate $A_{76}$ generates a memory cycle pulse MCA and after the key release an AND gate $A_{77}$ generates a memory cycle pulse MCB. An AND gate $A_{78}$ produces a signal MCA·$D_2$ upon receipt of the pulses MCA and $D_2$.

FIG. 21 shows the subtraction pulse generator 90. When the Q output of a flip-flop circuit $F_{30}$ is at a "1" level an AND gate $A_{80}$ is enabled during the positive half cycle of an AC voltage, producing at the output thereof an output $D_1 \cdot T_1$ to set the flip-flop $F_{30}$. As a result, the Q output of the flip-flop circuit $F_{30}$ becomes zero and the AND gate $A_{80}$ is disabled. That is, the $D_1 \cdot T_1$ pulse appearing at the output of the AND gate $A_{80}$ is one which is first generated during the positive half cycle of the AC supply voltage. The output $D_1 \cdot T_1$ of the AND gate $A_{80}$ is supplied to a shift register $S_7$ adapted to receive a pulse $\phi_1$ as a read-in pulse and a pulse $\phi_2$ as a readout pulse, and in consequence the output of the shift register $S_7$ is $D_1 \cdot T_2$. It will be apparent that in the case of a 50 Hz AC power supply fifty $D_1 \cdot T_2$ pulses per second are obtained and for a 60 Hz AC power supply 60 $D_1 \cdot T_2$ pulses are obtained.

Figure 22:
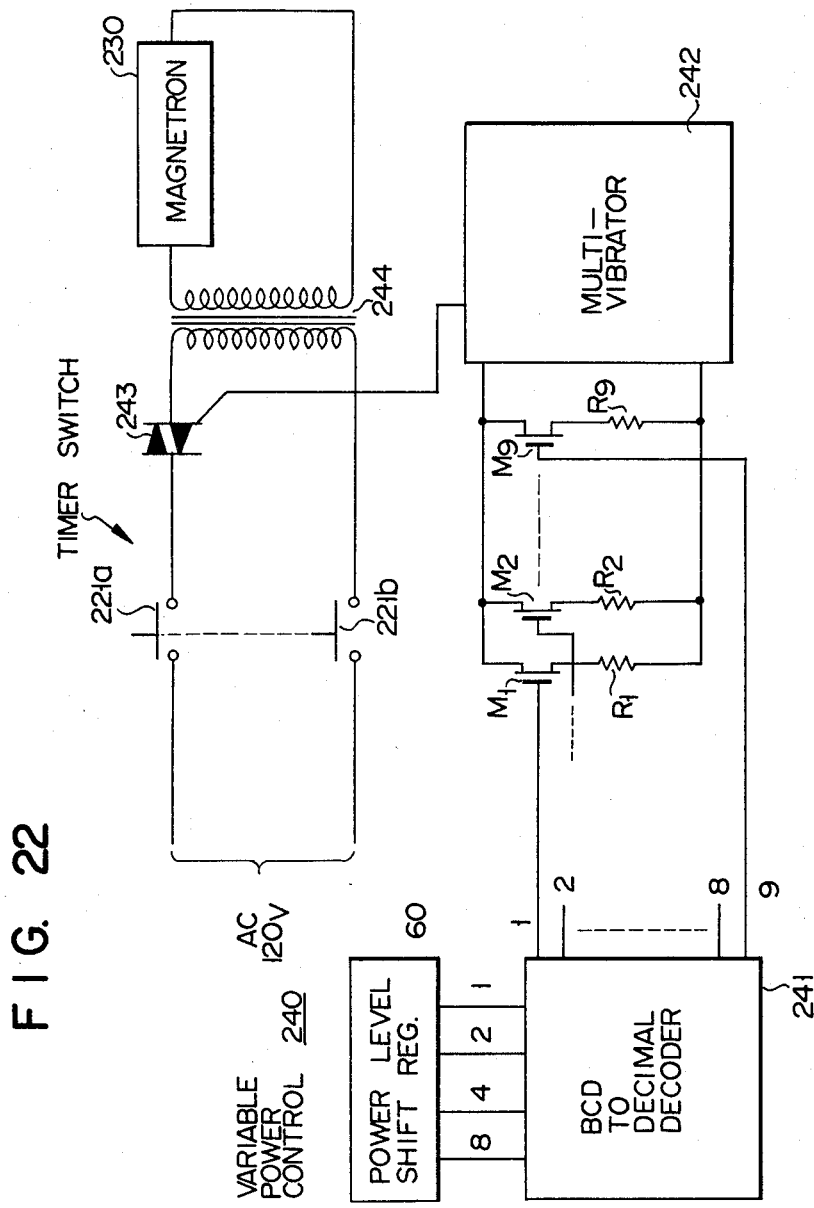
FIG. 22 shows a variable power control in FIG. 1.

FIG. 22 shows the variable power control 240. The outputs of power level shift register 60 are coupled to a binary-coded-decimal to decimal decoder 241. The nine outputs of the decoder 241 are respectively coupled to switches $M_1$ to $M_9$ such as MOS transistors connected in series ON-OFF rate setting resistors $R_1$ to $R_9$ in the time constant circuit of a multivibrator 242. An output of the multivibrator 242 is coupled to a triac 243 which is connected in series timer switches 221a and 221b on the primary side of a transformer 244 connected across the AC power supply source. The magnetron 230 is connected across the secondary winding of the transformer 244.

What we claim is:

1. A digital control device for controlling cooking time and power of an electric cooking device comprising:

keyboard means having numeral keys, timer key, power level key and cook key;

entry means coupled to said keyboard means to generate in response to the depression of one of said numeral keys an output as a numerical data corresponding to the numerical value of the depressed key;

first shift register means coupled to the output of said entry means having a plurality of digit stages and adapted to store in response to the depression of said timer key and numerical keys a time data on a cooking time of said cooking device which corresponds to the numerical values of the depressed numeral keys;

second shift register means coupled to the output of said entry means to store in response to the depression of said power level key and numerical key a data on a power level of said cooking device which corresponds to the latter depressed numeral key;

digital display means coupled to said first and second shift register means to display the data stored in said first and second shift register means;

subtraction pulse generating means for generating a subtraction pulse for passage of each predetermined unit of time;

subtraction means coupled to said first shift register means and said subtraction pulse generating means and adapted to subtract, for each generated subtraction pulse, a predetermined number from the time data in said first shift register means in response to the depression of said cook key;

cooking device control means coupled to said first shift register means and adapted to operate said cooking device in response to the depression of said cook key after the storage in said first and second shift registers of data on the cooking time and power level and stop the operation of said cooking device when the data in said first shift register become a predetermined number through subtraction;

variable power control means coupled to said second shift register means and adapted to set said cooking device to a power corresponding to the data stored in said shift register means;

error entry detecting means for detecting whether the value of a time data entered by said entry means in said first shift register means is erroneous; and means responsive to said error entry detecting means for (1) causing said display means to selectively flash only an erroneous digit or digits in said time data when said time data in said first register means contains a digit or digits with erroneous values, and for (2) maintaining the constant display of any digit with a non-erroneous value.

2. A control device according to claim 1, further including means for clearing said first shift register means and presetting a predetermined number to said second shift register means upon switching a power supply source ON.

3. A control device according to claim 1, further comprising means for causing said display means to selectively blank only the erroneous digit or digits in said time data.

4. A control device according to claim 1 further comprising means responsive to said error entry detecting means for stopping a subtraction operation by said subraction means when said time data in said first shift register means is erroneous.

5. A control device according to claim 1 further including means responsive to said error entry detecting means for causing said cooking device control means to prevent the operation of said cooking device irrespective of the depression of said cook key.

6. A control device according to claim 1, in which said first shift register means has first and second digit stages for storing a minute data from said entry means, third and fourth digit stages for storing a second data from said entry means, and fifth and sixth digit stages to which predetermined numerical data are preset, and there is further provided means for presetting a predetermined number to the respective digit stages when the data of the respective digit stages becomes a predetermined number during the subtraction of the time data in the first shift register means.

7. A control device according to claim 1, further including means for entering a data from said entry means in said first shift register in response to the depression of said timer key and to enter a data from said entry means in said second shift register means in response to the depression of said power level key.

8. A control device according to claim 1, further including means for detecting a non-significant zero or zeros in the time data in said first shift register means and causing said displaying means to blank the non-significant zero or zeros.

9. A control device according to claim 1, further including means for clearing said first shift register means in response to the depression of said timer key.

10. A control device according to claim 1, further including means for informing a user of an approach to the end of the cooking time when the time data in said first shift register means nears zero during the subtraction by said subtraction means of the time data in said first shift register means.

11. A control device according to claim 1, in which said subtraction pulse generating means is adapted to generate in response to a 50 or 60 Hz AC supply voltage one subtraction pulse per Hz of the AC voltage, said first shift register means includes first and second digit stages for storing a minute data from said entry means, third and fourth digit stages for storing a second data from said entry means and fifth and sixth digit stages to which predetermined numbers are preset, respectively, said subtraction means is adapted to effect the subtraction of the time data in said first shift register means comparing the content in a predetermined bit position of said sixth digit stage with said subtraction pulse and there is further provided means for presetting a different number to said sixth stage in accordance with the frequency of the AC voltage when the content of said sixth stage becomes a predetermined number during subtraction operation.

12. A control device according to claim 1 further comprising means for causing said subtraction means to stop the subtraction of the time data in said first shift register means when the door of said cooking device is opened.

13. A control device according to claim 1 further comprising means for preventing data entry into said first and second shift register means during the subtraction of the time data in said first shift register means after the depression of said cook key.

14. An electric cooking apparatus comprising:
memory means;
means accessible by a user for setting time data having a plurality of digits into said memory means;
digital display means coupled to said memory means for displaying the time data in said memory means;
an electric cooking device;
means for operating said electric cooking device during the time interval corresponding to the time data set in said memory means;
means coupled to said memory means for detecting any digit of the time data set in said memory means having an erroneous value; and
means responsive to said erroneous digit detecting means for causing said digital display means (1) to selectively blank any digit having a said detected erroneous value, and (2) to maintain the constant display of any digit having a non-erroneous value.

15. An electric cooking apparatus according to claim 14 further comprising means for disabling said means for operating said electric cooking device responsive to the detection of a said erroneous digit of time data entered into said memory means.

16. An electric cooking apparatus according to claim 14 further comprising means for causing said digital display means to selectively flash only the erroneous digit or digits.

17. An electric cooking apparatus comprising:
memory means;
means accessible by a user for setting time data having a plurality of digits into said memory means;
digital display means coupled to said memory means for displaying the time data in said memory means;
an electric cooking device;
means for operating said electric cooking device during a time interval corresponding to the time data set in said memory means;
means coupled to said memory means for detecting any digit of the time data set in said memory means having an erroneous value; and
means responsive to said erroneous digit detecting means for causing said digital display means to selectively flash any digit with a said detected erroneous value while maintaining the constant display of any digit having a non-erroneous value.

18. An electric cooking apparatus according to claim 17 further comprising means for disabling said means for operating said electric cooking device from operating said cooking device responsive to the detection of a said erroneous digit of time data entered into said memory means.

19. An electric cooking apparatus comprising:
memory means;
means accessible by a user for setting time data having a plurality of digits into said memory means, the maximum time settable into said memory means being predetermined;
digital display means coupled to said memory means for displaying the time data in said memory means;
an electric cooking device;
means for operating said electric cooking device during a time interval corresponding to the time data set in said memory means;
means coupled to said memory means for detecting whether the time data set in said memory means by the user exceeds the maximum settable time; and
means responsive to said detecting means for causing said digital display means to selectively flash only an erroneous digit or digits set in said memory means when the time data set in said memory means exceeds the maximum settable time and to maintain the constant display of any non-erroneous digit.

20. An electric cooking apparatus according to claim 19 further comprising means for disabling said means for operating said electric cooking device from operating said cooking device responsive to the detection of a said erroneous digit of time data entered into said memory means.

21. An electric cooking apparatus comprising:
a dynamic circulating shift register means;
keyboard means having numeral keys and a timer key;
means responsive to depression of said numeral keys after depression of said timer key for setting time data into said shift register means;
digital display means coupled to said shift register means for displaying the time data in said shift register means;
an electric cooking device;
means for operating said electric cooking device during a time interval corresponding to the time data set in said register means;
means responsive to depression of said timer key for clearing said shift register means;
means coupled to said memory means for detecting any digit of time data set into said shift register means; and
means responsive to said erroneous digit detecting means for causing said digital display means to visually indicate any digit with a said detected erroneous value while maintaining the constant display of any non-erroneous digit.

* * * * *